United States Patent
Yu et al.

(10) Patent No.: US 11,022,824 B2
(45) Date of Patent: Jun. 1, 2021

(54) ELECTRO-OPTICALLY ACTIVE DEVICE

(71) Applicant: ROCKLEY PHOTONICS LIMITED, London (GB)

(72) Inventors: Guomin Yu, Glendora, CA (US); Aaron Zilkie, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/463,337

(22) PCT Filed: Nov. 23, 2017

(86) PCT No.: PCT/EP2017/080220
§ 371 (c)(1),
(2) Date: May 22, 2019

(87) PCT Pub. No.: WO2018/096037
PCT Pub. Date: May 31, 2018

(65) Prior Publication Data
US 2019/0377204 A1 Dec. 12, 2019

Related U.S. Application Data

(60) Provisional application No. 62/426,117, filed on Nov. 23, 2016, provisional application No. 62/427,132, filed on Nov. 28, 2016.

(51) Int. Cl.
*G02F 1/01* (2006.01)
*G02B 6/00* (2006.01)
(Continued)

(52) U.S. Cl.
CPC ........ *G02F 1/01708* (2013.01); *G02F 1/0157* (2021.01); *G02F 1/01766* (2021.01); *G02F 2202/103* (2013.01); *G02F 2202/108* (2013.01)

(58) Field of Classification Search
CPC .. G02F 1/01708; G02F 2202/108; G02B 6/00
See application file for complete search history.

(56) References Cited

U.S. PATENT DOCUMENTS 5,163,118 A * 11/1992 Lorenzo ................. G02B 6/122
385/123
6,222,951 B1 * 4/2001 Huang ............... H04B 10/2587
385/14
(Continued)

OTHER PUBLICATIONS

Fang, Alexander W. et al., "Hybrid silicon evanescent devices", Materials Today, Jul.-Aug. 2007, pp. 28-35, vol. 10, No. 7-8, Elsevier Ltd.
(Continued)

*Primary Examiner* — Kaveh C Kianni
(74) *Attorney, Agent, or Firm* — Lewis Roca Rothgerber Christie LLP

(57) ABSTRACT

A silicon based electro-optically active device and method of production thereof. The device comprising: a silicon-on-insulator (SOI) layer; an electro-optically active stack, disposed on top of the SOI layer: a first epitaxially grown structure comprising a first passive waveguide and a second epitaxially grown structure comprising a second passive waveguide, the first and second passive waveguides being disposed adjacent to respective sides of the electro-optically active stack, wherein the first and second passive waveguides are configured to edge couple light from the first passive waveguide into the electro-optically active stack and from the electro-optically active stack into the second passive waveguide; and an evanescent coupling structure, for evanescently coupling light between the SOI layer and the first and second passive waveguides.

16 Claims, 43 Drawing Sheets

(51) Int. Cl.
*G02F 1/017* (2006.01)
*G02F 1/015* (2006.01)

(56) References Cited

U.S. PATENT DOCUMENTS

| | | | | |
|---|---|---|---|---|
| 7,257,283 | B1* | 8/2007 | Liu | G02B 6/12004 385/14 |
| 7,391,801 | B1* | 6/2008 | Soref | H01S 5/026 372/92 |
| 8,106,379 | B2* | 1/2012 | Bowers | B82Y 20/00 257/14 |
| 8,767,792 | B2* | 7/2014 | Bowers | H01S 5/34 372/75 |
| 9,500,807 | B2* | 11/2016 | Oka | G02B 6/1228 |
| 2002/0172464 | A1* | 11/2002 | Delwala | G02B 6/1225 385/40 |
| 2003/0003734 | A1* | 1/2003 | Delwala | G02B 6/12011 438/689 |
| 2003/0003735 | A1* | 1/2003 | Deliwala | G02B 6/124 438/689 |
| 2003/0003736 | A1* | 1/2003 | Delwala | G02B 5/045 438/689 |
| 2003/0003737 | A1* | 1/2003 | Delwala | G02B 5/045 438/689 |
| 2003/0003738 | A1* | 1/2003 | Delwala | G02B 6/12007 438/689 |
| 2004/0069984 | A1* | 4/2004 | Estes | G02B 6/4201 257/25 |
| 2004/0207016 | A1* | 10/2004 | Patel | H01L 27/14636 257/347 |
| 2004/0258347 | A1* | 12/2004 | Gothoskar | G02B 6/124 385/14 |
| 2005/0189591 | A1* | 9/2005 | Gothoskar | G02F 1/025 257/347 |
| 2005/0236619 | A1* | 10/2005 | Patel | H01L 27/1443 257/57 |
| 2006/0177173 | A1* | 8/2006 | Shastri | G02F 1/025 385/14 |
| 2008/0073744 | A1* | 3/2008 | Masini | H01L 31/109 257/466 |
| 2009/0016666 | A1* | 1/2009 | Kuo | G02F 1/017 385/2 |
| 2009/0324164 | A1* | 12/2009 | Reshotko | G02B 6/42 385/14 |
| 2010/0247021 | A1* | 9/2010 | Cunningham | G02F 1/025 385/1 |
| 2010/0247022 | A1* | 9/2010 | Li | G02B 6/12007 385/1 |
| 2010/0247029 | A1* | 9/2010 | Li | G02F 1/0147 385/14 |
| 2011/0215344 | A1* | 9/2011 | Dardy | G02F 1/025 257/83 |
| 2011/0299561 | A1* | 12/2011 | Akiyama | H01S 5/125 372/50.11 |
| 2012/0207479 | A1* | 8/2012 | Krishnamoorthy | G02F 1/025 398/85 |
| 2012/0219250 | A1* | 8/2012 | Ren | G02B 6/136 385/14 |
| 2012/0300796 | A1* | 11/2012 | Sysak | H01S 5/1032 372/6 |
| 2013/0039664 | A1* | 2/2013 | Clifton | H01S 5/3224 398/200 |
| 2013/0051727 | A1* | 2/2013 | Mizrahi | G02B 6/122 385/28 |
| 2013/0279845 | A1* | 10/2013 | Kobrinsky | G02B 6/12004 385/14 |
| 2013/0321816 | A1* | 12/2013 | Dattner | G01J 3/4531 356/451 |
| 2014/0270618 | A1* | 9/2014 | Dinu | G02F 1/225 385/3 |
| 2014/0307997 | A1* | 10/2014 | Bar | H01L 21/8252 385/14 |
| 2015/0125111 | A1* | 5/2015 | Orcutt | G02B 6/136 385/14 |
| 2015/0270684 | A1* | 9/2015 | Suzuki | H01S 5/1237 372/45.012 |
| 2016/0043262 | A1* | 2/2016 | Okumura | H01L 31/028 257/184 |
| 2016/0211645 | A1* | 7/2016 | Padullaparthi | H01S 5/1203 |
| 2017/0255077 | A1* | 9/2017 | Pruessner | G01S 7/4813 |
| 2019/0384003 | A1* | 12/2019 | Painchaud | G02B 6/2821 |

OTHER PUBLICATIONS

International Search Report and Written Opinion of the International Searching Authority, dated Mar. 8, 2018, Corresponding to PCT/EP2017/080220, 13 pages.

Marri-Morini, Delphine et al., "Optical Interconnects based on Ge/SiGe Multiple Quantum Well Structures", 2015, 2 pages, Optical Society of America.

Rouifed, Mohamed-Saïd et al., "Advances Toward Ge/SiGe Quantum-Well Waveguide Modulators at 1.3μm", IEEE Journal of Selected Topics in Quantum Electronics, Jul./Aug. 2014, 4 pages, vol. 20, No. 4, IEEE.

* cited by examiner

| Passive | Value | Unit |
|---|---|---|
| modal expander on SOI | 0.9994 | |
| evanescent coupling from Si wvgd to SiGe wvgd | 0.996 | |
| SiGe wvgd modal expanding from 0.7um to 2.5um | 0.996 | |
| SiGe wvgd and MQW wvgd modal overlapping | 0.974 | |
| total efficiency | 0.966 | |
| total passive loss | 0.304 | db |
| Active | | |
| 0V MQW wvgd modal loss | 598.41 | dB/cm |
| 2V MQW wvgd modal loss | 1930 | dB/cm |
| Active length | 40 | um |
| Active IL | 2.39 | dB |
| Active ER | 5.33 | dB |
| Total IL | 2.70 | dB |
| Link penalty | 7.21 | dB |

FIG. 8

Process flow with 3μm SOI

SiGe MQW EPI Growth

MQW active region patterning

- PECVD deposit SiO2 hard mask
- Lithography of MQW active mesa

- Leave ~20nm SiO2 on top of MQW stack after CMP

Deposit hard mask for waveguide etching

Section view at position A

Section view at position C

Section view at position B (MQW)

Deposit SiO2 and Taper slab patterning (strip to rib converter)

Section view at position A

Section view at position C

Section view at position B (MQW)

Taper slab etching (strip to rib converter)

Section view at position B (MQW)

Deposit SiO2 and VIA opening and etching

Section view at position B (MQW)

Metal deposition and electrode patterning

Section view at position B (MQW)

Electrode etching and PR stripping

Alternative Device Structure
• Top electrode pad on top of $Si_{0.6}Ge_{0.4}$ layer

ELECTRO-OPTICALLY ACTIVE DEVICE

CROSS-REFERENCE TO RELATED APPLICATION(S)

This application is a national stage entry, under 35 U.S.C. § 371, of International Application Number PCT/EP2017/080220, filed on Nov. 23, 2017, which claims priority to and the benefit (i) of U.S. Provisional Patent Application No. 62/426,117, filed Nov. 23, 2016, and (ii) of U.S. Provisional Patent Application No. 62/427,132, filed Nov. 28, 2016. The entire contents of all of the applications identified in this paragraph are incorporated herein by reference.

FIELD OF THE INVENTION

The present invention relates to silicon based electro-optically active devices, and particularly to electro-optic modulators.

BACKGROUND

As shown in FIG. 1, conventional electro-optically active devices may comprise a silicon substrate 101, on which is formed first and second passive waveguides 102a and 102b. An electro-optically active EPI stack 103 is grown in a gap between the passive waveguides, and may include first and second faceted regions 104a 104b.

These faceted regions can produce significant losses in the device.

SUMMARY

Generally, the invention provides an electro-optically active device and method of production thereof, where an electro-optically active EPI stack is etched to produce a non-faceted edge and a passive waveguide is subsequently grown adjacent to the non-faceted edge.

Accordingly, in a first aspect, the invention provides a silicon based electro-optically active device comprising: a silicon-on-insulator (SOI) layer; an electro-optically active waveguide including an active stack, disposed on top of the SOI layer; a first epitaxially grown structure having a first passive waveguide and a second epitaxially grown structure having a second passive waveguide, the first and second passive waveguides being disposed adjacent to respective sides of the electro-optically active stack, wherein the first and second passive waveguides are configured to edge couple light from the first passive waveguide into the electro-optically active stack and from the electro-optically active stack into the second passive waveguide; and an evanescent coupling structure, for evanescently coupling light between the SOI layer and the first and second passive waveguides.

The term 'adjacent' as used above may mean either (i) directly adjacent, i.e. with no intermediate layers or (ii) adjacent but separated by, for example, an insulation layer where the separation layer does not notably affect the optical coupling between the passive waveguides and the electro-optically active stack. The silicon-on-insulator layer may be a silicon-on-insulator waveguide. The layer may comprise a waveguide region and a silicon base region for the electro-optically active device, wherein the waveguide region is located on either side of the electro-optically active waveguide. Structurally there may be no difference between the silicon waveguide region and the silicon base region of the silicon-on-insulator layer. Functionally it may be that the silicon base region is not used for guiding light whereas the silicon waveguide region may be used for guiding light. Both regions may be suitable for guiding light, and the layer in general may have a guiding direction along which it is suitable for guiding light.

By electro-optically active stack, it may be meant that the stack comprises plural functional layers some of which are electro-optically active. For example, the stack may include a P doped layer and an N doped layer, separated by an intermediate layer. These layers may be layered relative to the SOI waveguide on which the stack is formed i.e. they are horizontal layers. Typically the active stack of the electro-optically active waveguide includes a multiple quantum well (MQW) material.

In a second aspect, the invention provides a method of producing a silicon based electro-optically active device, including the following steps: epitaxially growing an electro-optically active stack on top of an SOI layer, and etching the electro-optically active stack to form an electro-optically active waveguide; etching opposite sides of the electro-optically active stack to produce planar sides; forming a first passive waveguide and a second passive waveguide, each being adjacent to respective planar sidewalls of the electro-optically active stack, wherein the first and second passive waveguides are configured to edge couple light from the first passive waveguide into the electro-optically active stack and from the electro-optically active stack into the second passive waveguide; and forming evanescent coupling structures between the first passive waveguide and the SOI layer and between the second passive waveguide structure and the SOI layer, for evanescently coupling the SOI layer to the first passive waveguide and the second passive waveguide. The planar sides may be planar or substantially planar.

Optional features of the invention will now be set out. These are applicable singly or in any combination with any aspect of the invention.

The evanescent coupling structure may be formed by a first evanescent coupling structure and a second evanescent coupling structure, wherein the first evanescent coupling structure may be adjacent to a first interface between the first passive waveguide and the electro-optically active stack, and the second evanescent coupling structure may be adjacent to a second interface between the second passive waveguide and the electro-optically active stack. The first evanescent coupling structure may comprise: a first taper region, an evanescent coupling region, and a second taper region. In the first taper region, an SOI waveguide optical mode expands into an optical mode of a combined SOI waveguide that combines a SOI waveguide core layer and a bottom silicon cladding layer of the first passive waveguide; in the evanescent coupling region, light is evanescently coupled into the first passive waveguide from the combined SOI waveguide; in the second taper region, an optical mode of the first passive waveguide expands to match an optical mode of the electro-optically active stack to reduce the optical mode mismatch loss. The second evanescent coupling structure may have the same three regions with the same functions but in a reversed order.

In use, light being transmitted through the device is expanded into the combined SOI waveguide that comprises the core layer of SOI waveguide with the silicon bottom layer of the first passive waveguide. Then the light is evanescently coupled from the combined SOI waveguide into the first passive waveguide which may contain a core layer of SiGe. The light is expanded again to match the optical mode of the electro-optically active stack, and then edge coupled from the first passive SiGe waveguide into the electro-optically active stack, and any remaining light is then edge coupled into the second passive waveguide which may contain a further core layer of SiGe. The light is then coupled from the further SiGe waveguide back into the silicon-on-insulator waveguide in a sequence which is the reverse of that described above.

The core layer in the passive waveguide(s) may be formed of SiGe containing less than 40 at. % germanium. at. % refers to the atomic percent, and so in this example no more than 40% of the atoms comprising the SiGe are germanium atoms.

Each of the first and second passive waveguides may be made up of a plurality of layers, such as a sandwich structure of Si/SiGe/Si. The sandwich structure may be organised in layers from the top surface of the SOI upwards, i.e. an Si layer may be disposed immediately on top of the SOI, an SiGe layer disposed immediately on top of the Si layer, and a final Si layer disposed immediately on top of the SiGe layer. The thickness of the sandwich structure may be designed such that the optical mode within the passive waveguides (e.g. within the Si/SiGe/Si) matches the optical mode of the electro-optically active stack with minimum mode mismatch loss at the interfaces therebetween.

The electro-optically active stack may have a parallelogramal or trapezoidal geometry when viewed from above (top down view).

The electro-optically active stack may include one or more angled interfaces which are angled relative to the wave-guiding direction of the SOI waveguide. The angled interfaces may be formed by the interface between the electro-optically active stack and the first and second passive waveguides. These interfaces may be angled relative to a guiding direction on the SOI waveguide i.e. angled relative to a length of the device. The angle may be between 80° and 89°.

The device may further comprise a first and second insulator layer respectively disposed between the electro-optically active stack and the first passive waveguide and second passive waveguide respectively.

The device may be a quantum confined Stark effect modulator. The electro-optically active stack may include a multiple quantum well region.

In some embodiments, the electro-optically active stack is ordered as follows going up from a layer immediately adjacent to the SOI: a buffer layer comprising SiGe, a P doped layer comprising SiGe, a spacer layer comprising SiGe, a quantum well multiple quantum well layer comprising Ge/SiGe, a further spacer layer comprising SiGe, an N doped layer comprising SiGe, an N doped layer comprising SiGe, and an N+ doped layer comprising SiGe.

More particularly, in some embodiments, the electro-optically active stack is ordered as follows going up from a layer immediately adjacent to the SOI: a 400 nm buffer layer comprising $Si_{0.28}Ge_{0.72}$, a 200 nm P doped layer comprising $Si_{0.28}Ge_{0.72}$, a 50 nm (or 20 nm) spacer layer comprising $Si_{0.28}Ge_{0.72}$, a quantum well layer comprising 7 (or 10) quantum wells with each of the wells comprising 10 nm Ge well layer and 12 nm $Si_{0.436}/Ge_{0.57}$ barrier layer Ge/$Si_{0.43}Ge_{0.57}$, a further 50 nm (or 20 nm) spacer layer comprising $Si_{0.28}Ge_{0.72}$, a 300 nm N doped layer comprising $Si_{0.28}Ge_{0.72}$, a 200 nm N doped layer comprising $Si_{0.8}Ge_{0.2}$, and a 100 nm N+ doped layer comprising $Si_{0.8}Ge_{0.2}$. In some embodiments, the 400 nm buffer layer can be P doped to reduce series resistance to achieve high speed.

The step of forming the first passive waveguide and the second passive waveguide may comprise epitaxially growing a first structure and a second structure and etching the first structure and the second structure to form the first passive waveguide and the second passive waveguide.

The method may include a step of disposing a first and second insulator layer adjacent to respective sides of the electro-optically active stack before epitaxially growing the first structure and second structure.

The method may include a step of disposing an insulator cap layer on top of the electro-optically active stack before epitaxially growing the first and second structures.

The step of etching the device to produce an evanescent coupling structure may include etching the first and second passive waveguides so as to produce a first evanescent coupling structure and a second evanescent coupling structure.

BRIEF DESCRIPTION OF THE DRAWINGS

Embodiments of the invention will now be described by way of example with reference to the accompanying drawings in which:

FIG. 8 shows the results of the simulation of the device shown in FIG. 4;

DETAILED DESCRIPTION AND FURTHER OPTIONAL FEATURES

Figure 2:
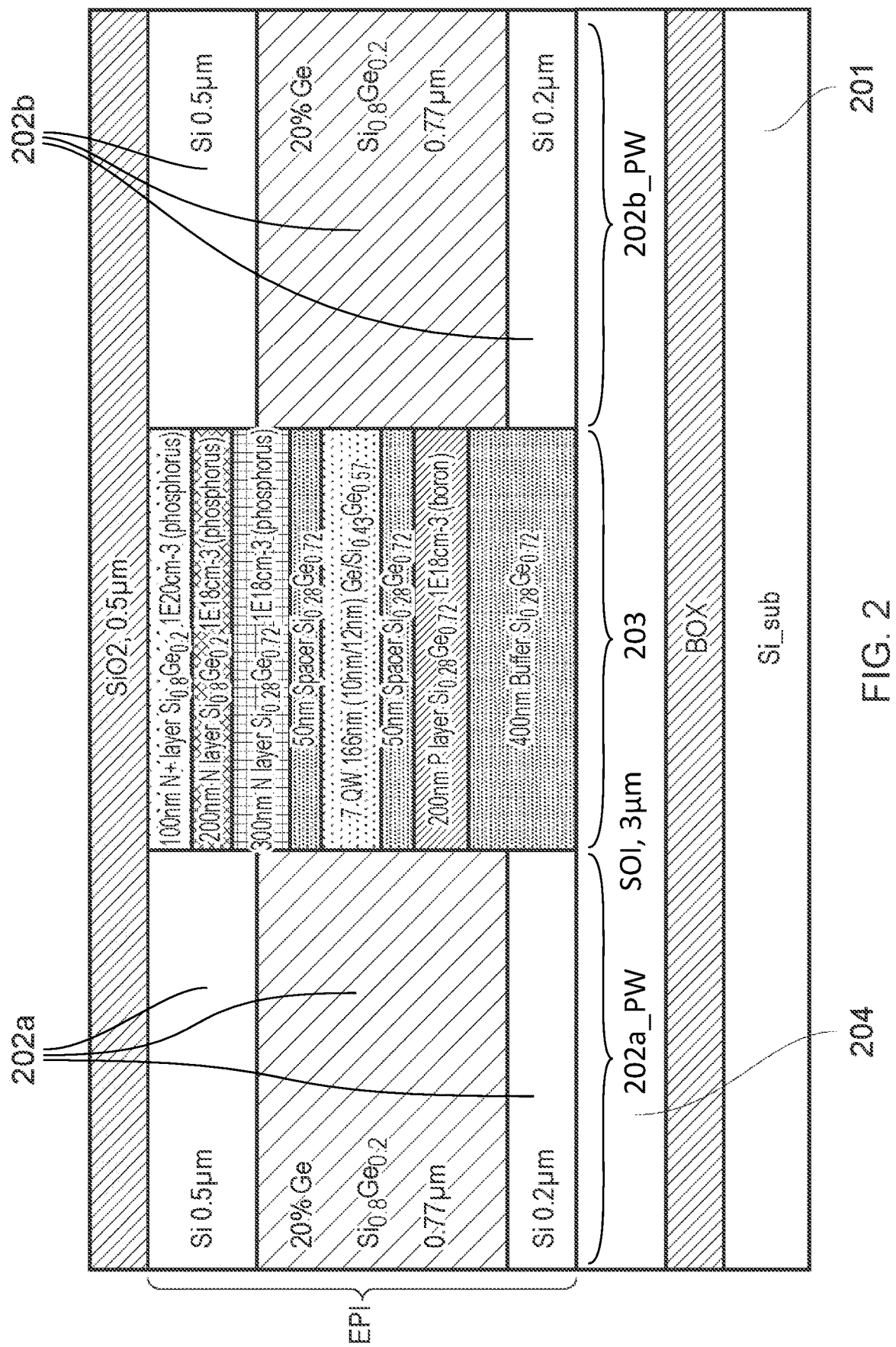
FIG. 2 shows a cross-sectional view of the edge coupling region between the electro-optically active stack and the first and second passive waveguides according to the present invention.
Figure 4:
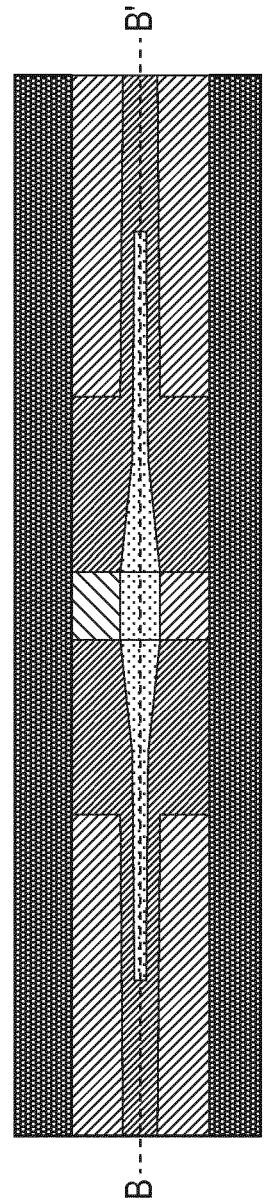
FIG. 4 shows a top-down view of the device shown in FIG. 3.

FIG. 2 shows an edge coupling region between an electro-optically active stack and SiGe passive waveguides in an electro-optically active device which comprises a silicon substrate 201. FIG. 2 is a cross-sectional view of the middle region taken along the line B-B' as shown in FIG. 4. Disposed on top of the substrate is a buried oxide layer (BOX), and on top of the BOX layer is a silicon-on-insulator (SOI) waveguide 204 which is around 3 μm thick. On top of two regions of the SOI waveguide, there are respective first and second epitaxially grown structures 202a and 202b. The structures in this example comprise three layers: an Si layer directly on top of the SOI, this layer is 0.2 μm thick; a $Si_{0.8}Ge_{0.2}$ layer is directly on top of the Si layer, this layer is 0.77 μm thick; and a further Si layer is directly on top of the $Si_{0.8}Ge_{0.2}$ layer, this layer is 0.5 μm thick. The structures are etched to form SiGe passive waveguides. A stack of the Si layer directly on top of the SOI, the $Si_{0.8}Ge_{0.2}$ layer, and the SI layer directly on top of the $Si_{0.8}Ge_{0.2}$ layer of the first epitaxially grown structure 202a may be a first passive waveguide 202a PW of the first epitaxially grown structure 202a, and a stack of the Si layer directly on top of the SOI, the $Si_{0.8}Ge_{0.2}$ layer, and the SI layer directly on top of the $Si_{0.8}Ge_{0.2}$ layer of the second epitaxially grown structure 202b may be a second passive waveguide 202b PW of the second epitaxially grown structure 202b.

In between the SiGe passive waveguides there is an electro-optically active EPI stack 203. The stack comprises multiple layers, which are ordered as follows going up from a layer immediately adjacent to the SOI: a 400 nm buffer layer comprising $Si_{0.28}Ge_{0.72}$, a 200 nm P doped layer comprising $Si_{0.28}Ge_{0.72}$, a 50 nm (or 20 nm) spacer layer comprising $Si_{0.28}Ge_{0.72}$, a quantum well multiple quantum well layer comprising 7 (or 10) quantum wells with each of the wells comprising 10 nm Ge well layer and 12 nm $Si_{0.43}Ge_{0.57}$ barrier layer, a further 50 nm (or 20 nm) spacer layer comprising $Si_{0.28}Ge_{0.72}$, a 300 nm N doped layer comprising $Si_{0.28}Ge_{0.72}$, a 200 nm N doped layer comprising $Si_{0.8}Ge_{0.2}$, and a 100 nm N+ doped layer comprising $Si_{0.8}Ge_{0.2}$. The electro-optically active EPI stack is etched to form an electro-optically active waveguide. The waveguide has a typical width of 2.5 um.

The P doped layer may be doped with boron to a concentration of $1 \times 10^{18}$ cm$^{-3}$. The N doped layer may be doped with phosphorus to a concentration to $1 \times 10^{18}$ cm$^{-3}$. The N+ doped layer may be doped with phosphorus to a concentration of between $1 \times 10^{19}$ cm$^{-3}$ and $1 \times 10^{29}$ cm$^{-3}$.

Figure 3:
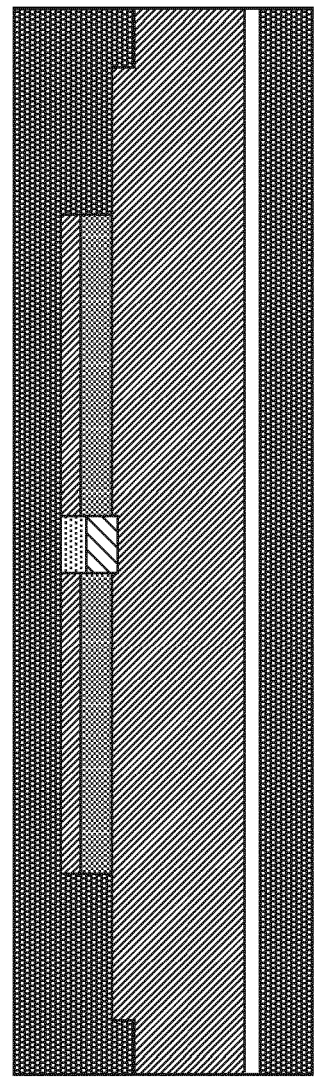
FIG. 3 shows a zoomed-out view of the cross-section of an electro-optically active device.

FIG. 3 shows the whole device in a zoomed-out cross-section that includes the edge coupling region shown in FIG. 2. The electro-optically active stack, which in this example is a waveguide, can be seen as the multiple-banded region in the upper middle section of FIG. 3. Moving down FIG. 3, the SOI waveguide can be seen as well as the silicon substrate on which the SOI was grown. FIG. 4 shows the whole device of FIG. 3 but from a top-down perspective (i.e. the image of FIG. 3 rotated by 90°). The electro-optically active waveguide can be seen in the centre of FIG. 4, and the tapered nature of the evanescent coupling structure can also be seen to the left and right of the electro-optically active waveguide.

Figure 5A:
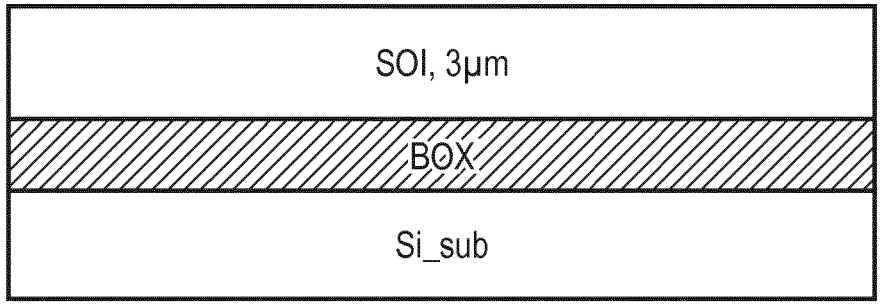
FIG. 5A-5O show manufacturing stages to produce a device as shown in FIG. 4

FIG. 5A shows a first step in producing the device shown in FIG. 4. Here, a 3 μm thick silicon-on-insulator layer is provided on top of a BOX. The BOX itself is provided on top of a silicon substrate.

Figure 5B:
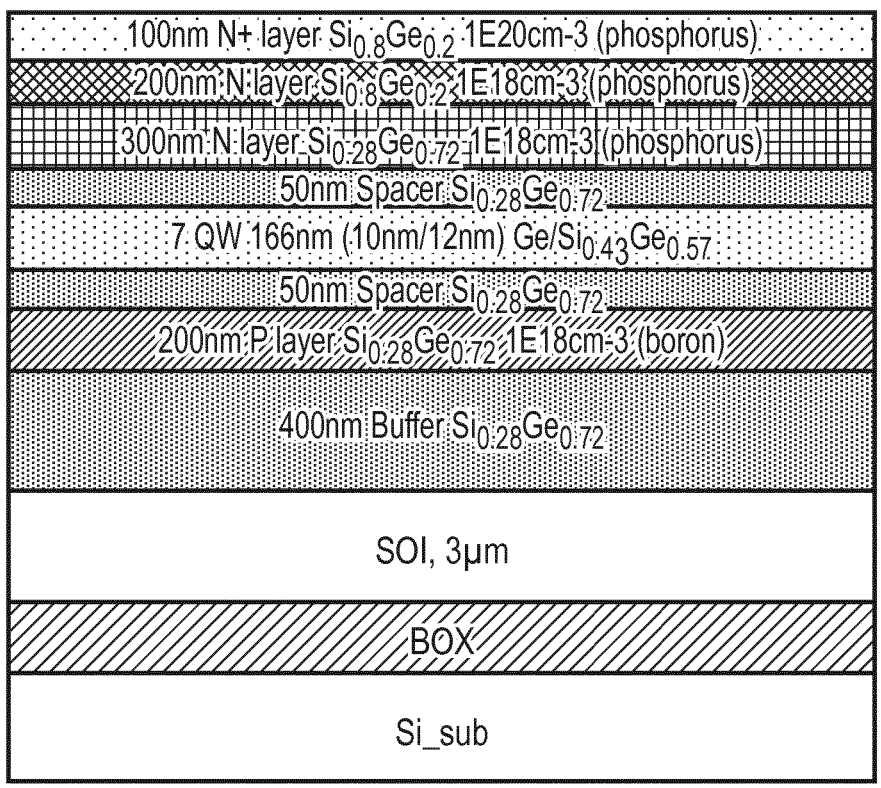

In a next step, as shown in FIG. 5B, the electro-optically active stack is epitaxially grown across the SOI. The electro-optically active stack can either be blanket epitaxially grown or grown via another mode of epitaxy. However blanket epitaxy is may result in a better quality electro-optically active stack.

Figure 5C:
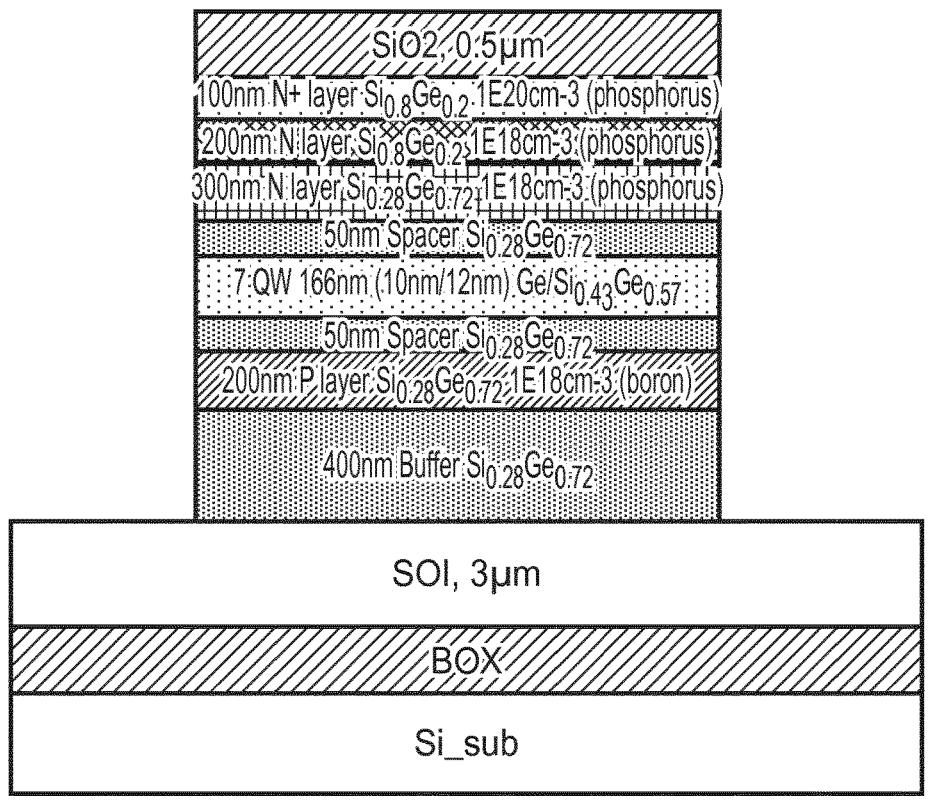

The electro-optically active stack is then etched on opposing sides with a 0.5 μm SiO2 hard mask on top, to produce substantially planar surfaces as shown in FIG. 5C. This etching step can be described as etching electro-optically active stack so as to produce a mesa.

Figure 5D:
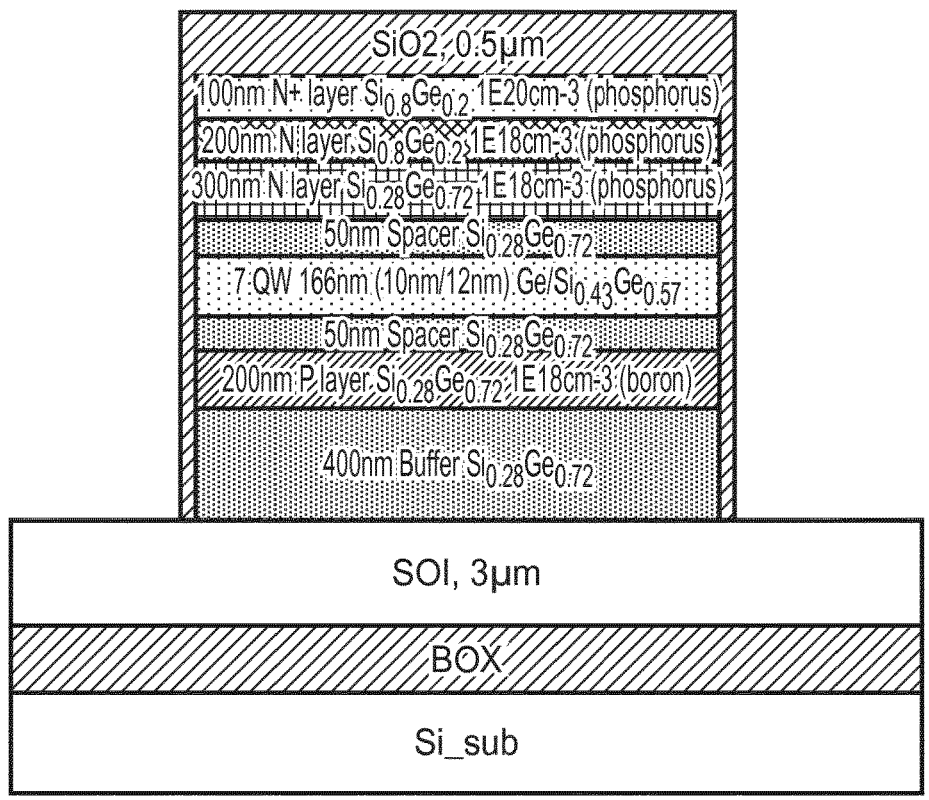

Following the etching step, a 10-20 nm thick $SiO_2$ layer is provided over the substantially planar surfaces as shown in FIG. 5D. The layer of $SiO_2$ provided over the planar surfaces of the electro-optically stack may provide a first insulator layer 510a between the electro-optically active stack and the first passive waveguide and a second insulator layer 510b between the electro-optically active stack and the second passive waveguide (see FIG. 5H). This can help protect the electro-optically active stack, and the now planar surfaces, by preventing the SiGe structure from growing on the electro-optically active mesa facets during the subsequent regrowth steps (instead the Si/SiGe grows only from the SOI).

Figure 5E:
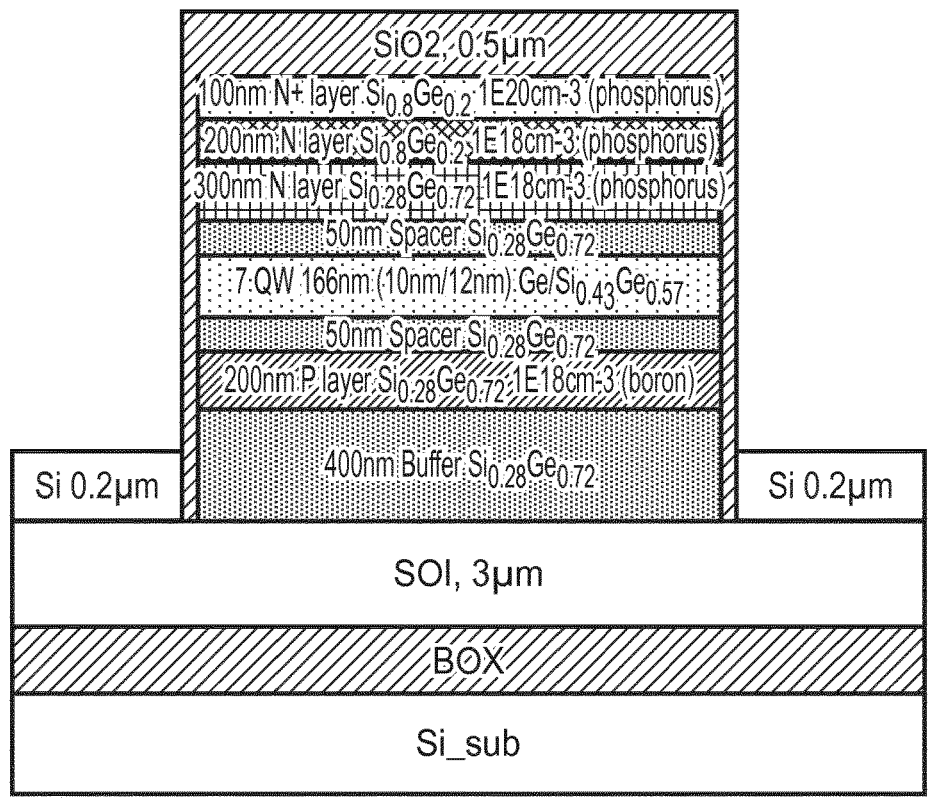
Figure 5F:
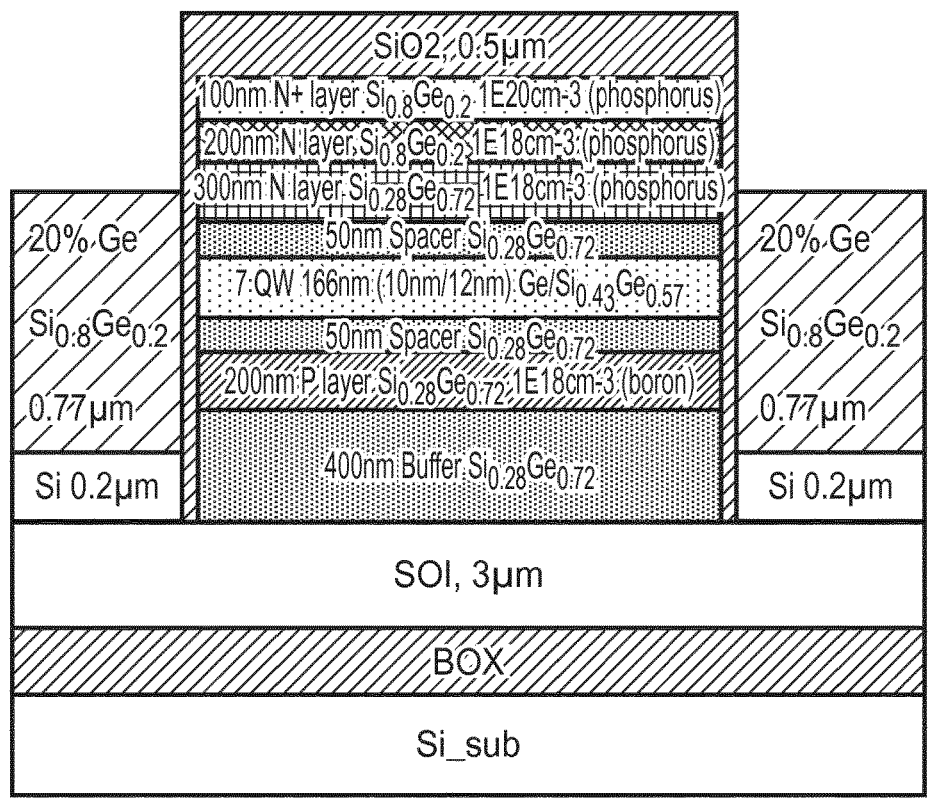
Figure 5G:
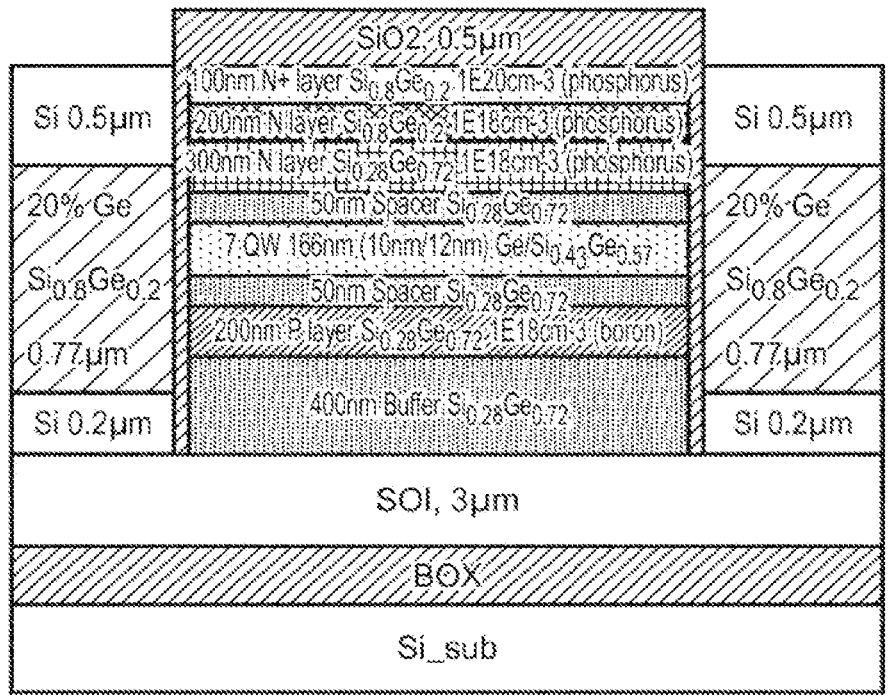

In FIG. 5E, a step of epitaxially regrowing a Si layer either side of the electro-optically active stack is shown. The Si layers are grown from the SOI layer until they are approximately 0.2 μm thick. After the Si layers has been regrown, respective $Si_{0.8}Ge_{0.2}$ layers are epitaxially regrown on top of the Si layers. The $Si_{0.8}Ge_{0.2}$ layers are approximately 0.77 μm thick (FIG. 5F). Next, further respective Si layers are epitaxially regrown on top of the $Si_{0.8}Ge_{0.2}$ layers. The further Si layers are regrown until they are approximately 0.5 μm thick (FIG. 5G). The epitaxially grown first and second structures are now complete. The re-growth process should take place at a temperature of less than 450° C.

Figure 1:
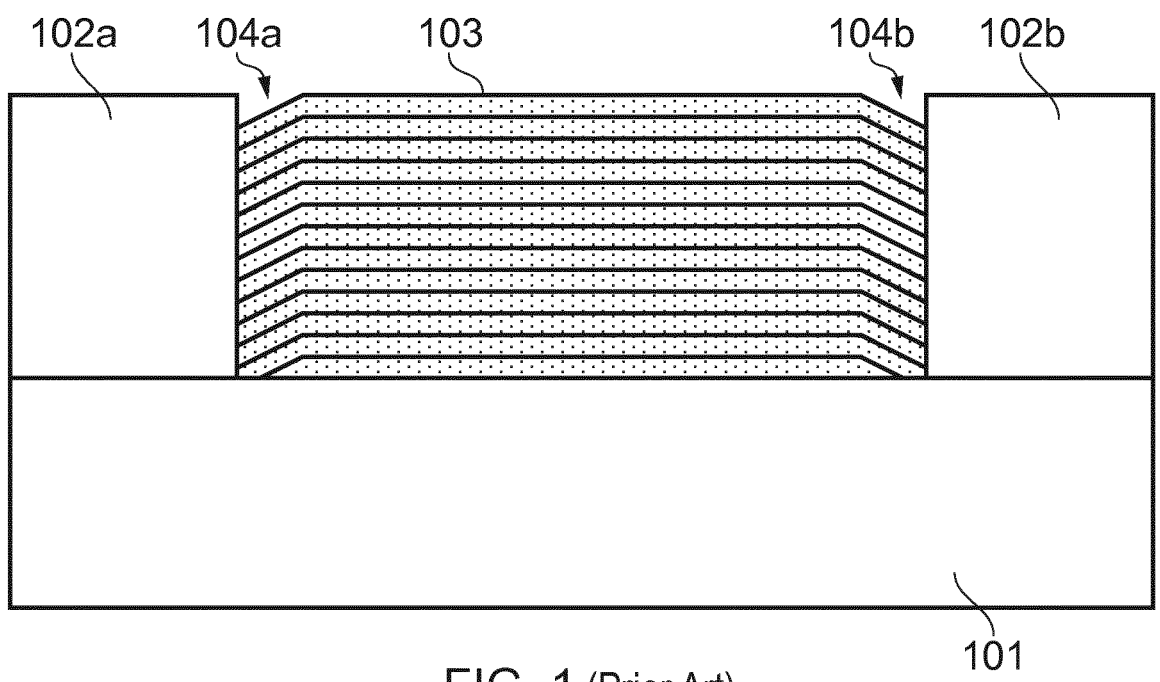
FIG. 1 shows an example of the prior art.
Figure 5H:
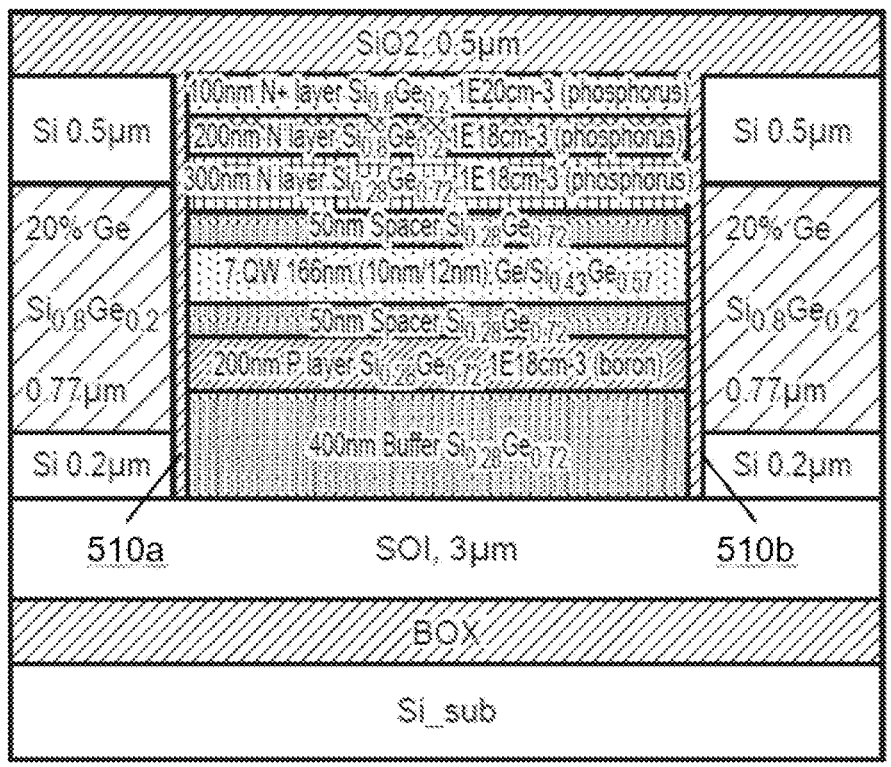

As shown in FIG. 5H, a $SiO_2$ capping layer is provided over the top of the electro-optically active stack and structures to planarize the top surface. This completes the main production steps for further producing a waveguide for the electro-optically active device stack which does not include the faceted regions evident in FIG. 1.

Figure 5I:
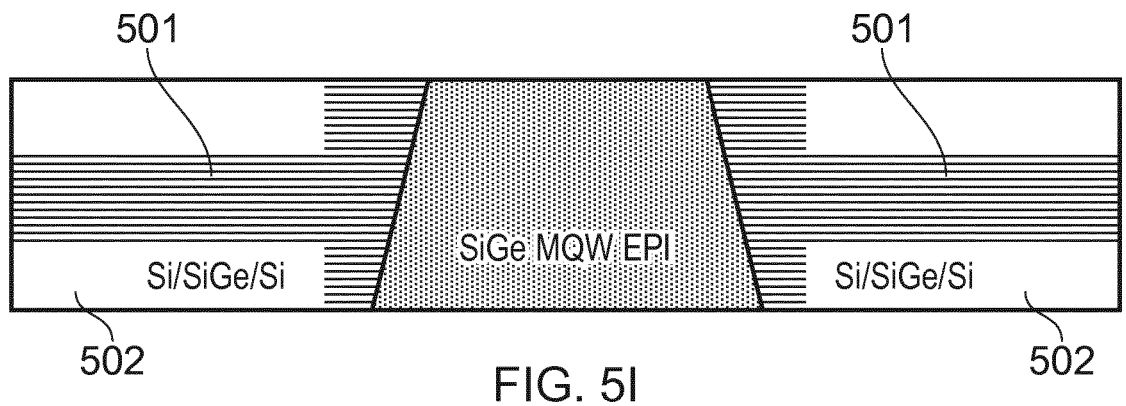
Figure 5J:

FIG. 5I shows the device of FIG. 5H from above i.e. looking down on the device. In this step, a mask 501 is formed in the $SiO_2$ capping layer to provide an etching hard mask for making first and second passive waveguides in the first and second structures and protecting the epitaxially active stack region. This allows the unmasked regions 502 of the epitaxially grown structures to be etched, producing a rib waveguide upstanding from the SOI waveguide. The result of this etching, and also of removing the mask 501, is shown in FIG. 5J.

Figure 5K:
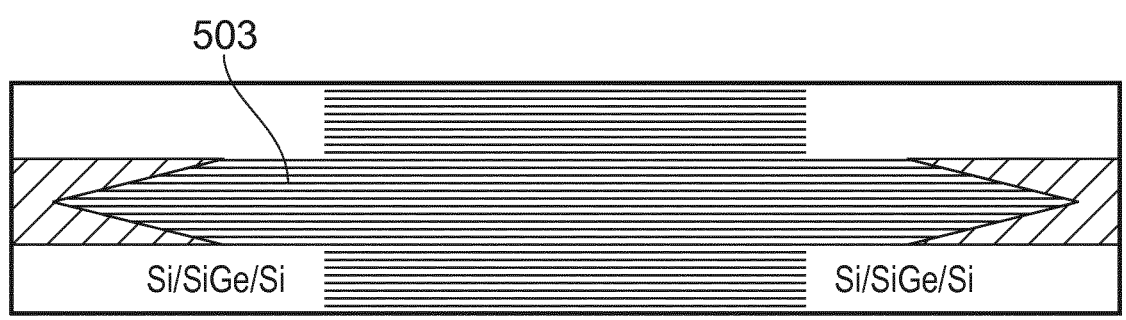

In a next step, shown in FIG. 5K, a further mask 503 is applied to the whole of the electro-optically active stack but only a part of the rib waveguide. The mask is applied so that, when the unmasked regions are etched to the top of the SOI, the resulting waveguide has a taper. In other words, the bottom Si layer of 0.2 μm and up to SiGe and Si layers of the passive waveguides are etched away in the unmasked region, resulting in a Si taper on the SOI waveguide. For example, on the left-hand side of the stack the waveguide tapers from a narrowest width to a widest width, the widest width being adjacent to the electro-optically active stack. The result of this can be seen in FIG. 5L.

Figure 5L:

Also, shown in FIG. 5L is a further mask 504 applied to parts of the waveguide immediately adjacent to the electro-optically active stack. This mask 504 is, like mask 503, tapered. In this step, the SiGe layer and up Si layer are etched away, the masked portion of the waveguide provides the evanescent coupling region and further tapered regions. In other words, the unmasked regions are etched to the top of the bottom Si layer in the passive waveguides.

Figure 5M:
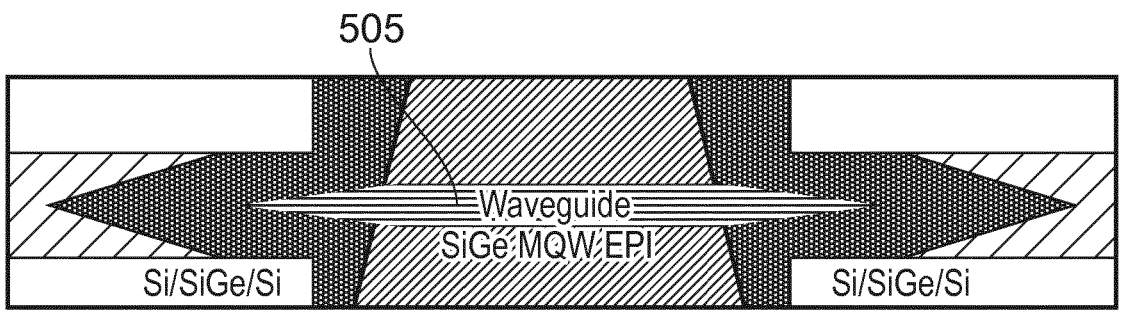
Figure 5N:
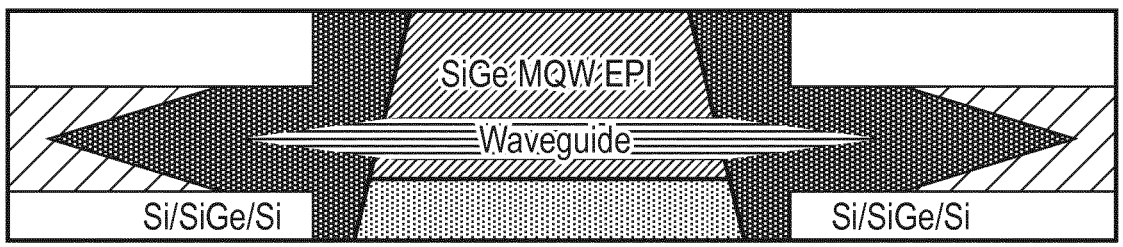
Figure 5O:
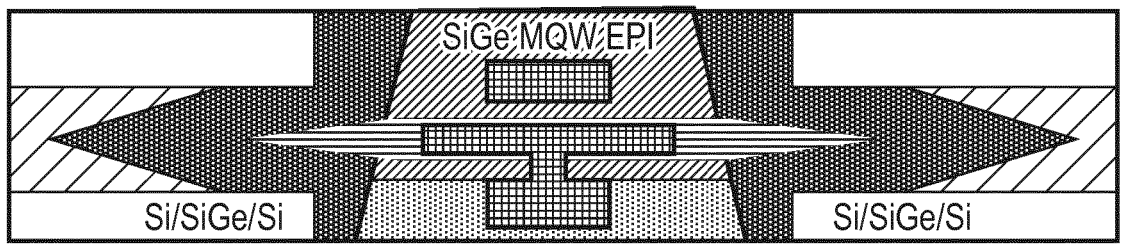

Next, as shown in FIG. 5M, a further mask 505 is applied to a portion of the electro-optically active stack, and the unmasked portions are etched until the P doped layer is exposed to form a waveguide in the electro-optically active stack. Then, as shown in FIG. 5N, one side of the electro-optically active stack is etched to remove the P doped layer and so expose the buffer layer to make room for a top electrode pad. Therefore, as shown in FIG. 5O, after VIA etching, electrodes are fabricated onto the N doped layer on the top of the electro-optically active waveguide, with a part of the electrode pad sitting on the buffer layer and also another electrode pad directly on the P doped layer.

Figure 6:
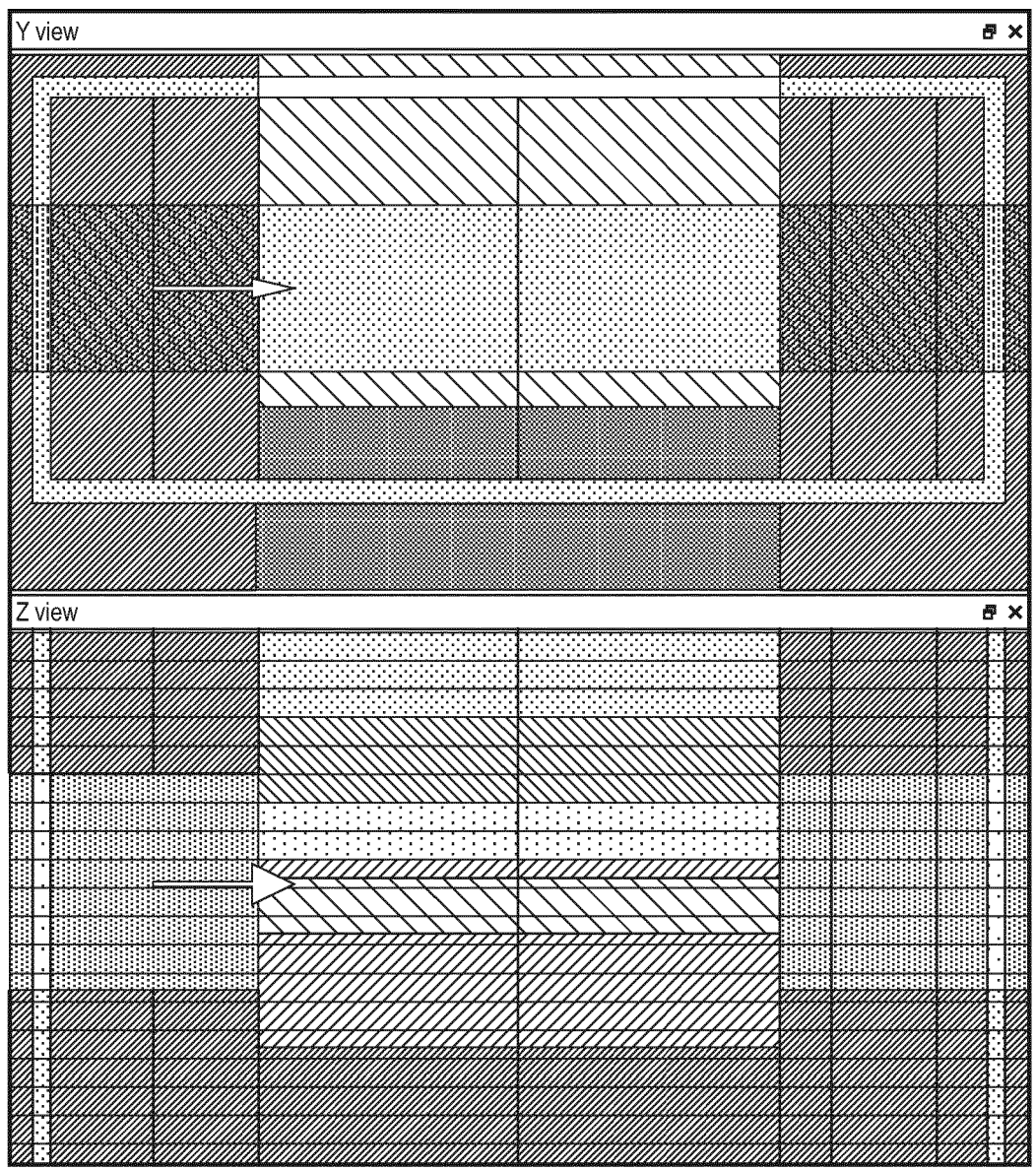
FIG. 6 shows a simulation of the edge coupling region shown in FIG. 2.
Figure 7:
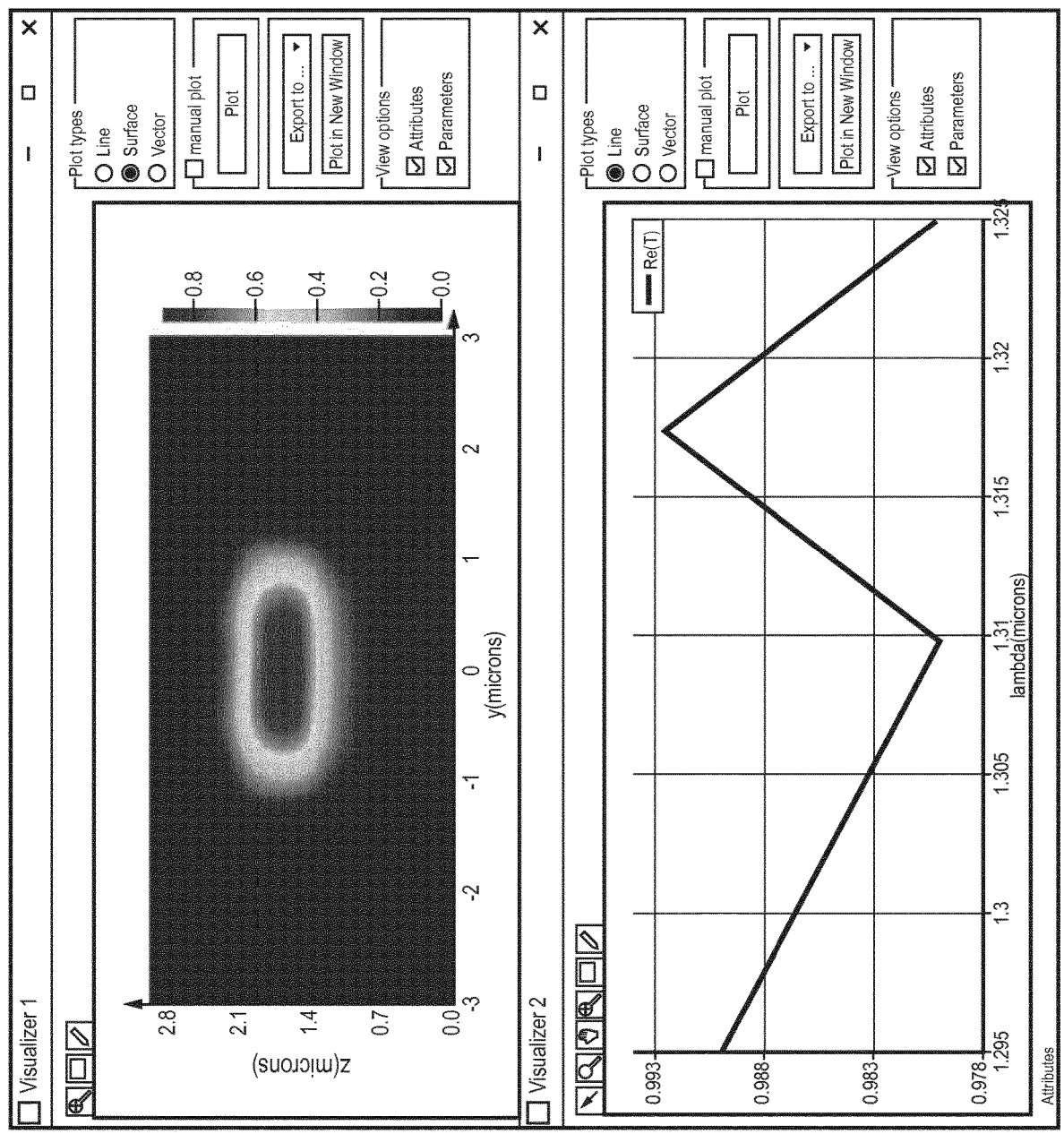
FIG. 7 shows the results of the simulation of FIG. 6.

FIG. 6 shows a simulated edge coupling region according to FIG. 2 simulated by using FDTD software for estimating the passive optical loss, and FIG. 7 shows the corresponding results. As can be seen from the plot in the upper part of FIG. 7, the optical mode within the waveguide is well contained. Further simulation results of the whole device of FIG. 4 are shown in FIG. 8. A notable result is that the device as simulated can provide an extinction ratio of 5.33 dB, optical insertion loss of 2.70 dB and power link penalty of 7.21 dB.

Figure 9:
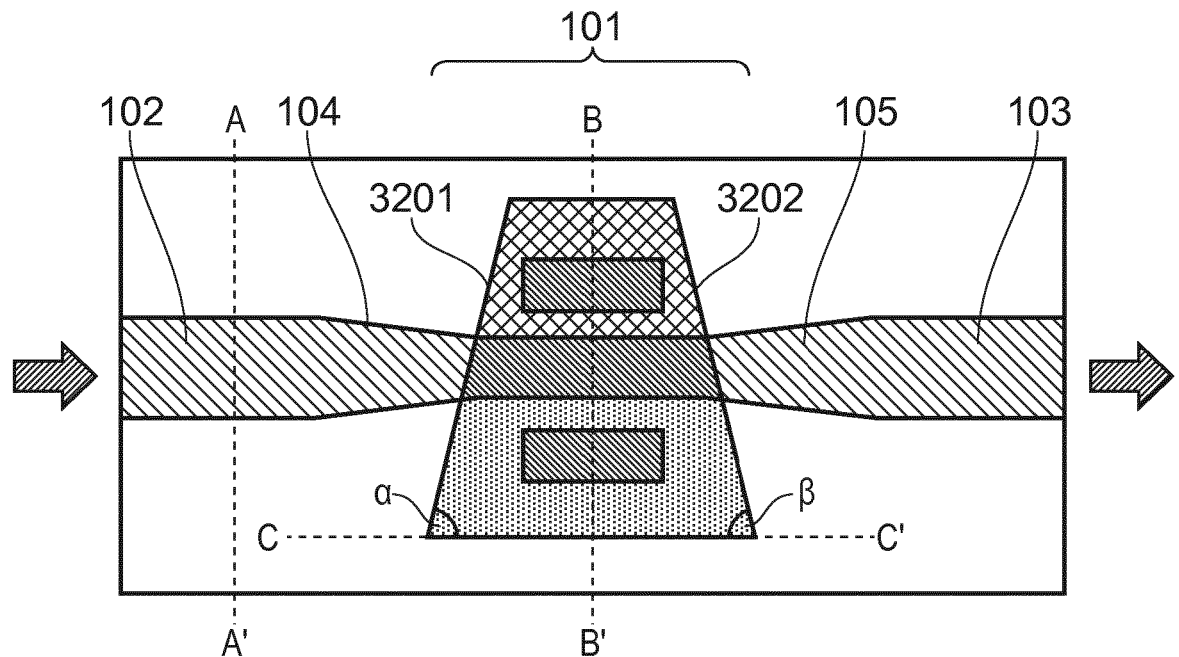
FIG. 9 shows a top down view of electro-optically active device, also shown is an input waveguide with an input taper waveguide region and an output waveguide with an output waveguide taper region.

The embodiments discussed above may be arranged to have angled interfaces between the electro-optically active stack and adjacent input and output. In such angled embodiments, the cross-section along B-B' (shown in FIG. 4) would be the same or substantially the same as that shown in the previous figures, but the device as viewed from above would exhibit angled interfaces. An example of such a further embodiment of an electro-optically active device is shown in FIG. 9.

This embodiment differs from the previous embodiments in that a first interface 3201 and second interface 3202 (or first and second angled facets) of the electro-optically active device 101 are respectively angled relative to a line C-C' which is parallel to the direction of light propagation through the device (indicated by the arrows) i.e. it is aligned with the guiding direction of the input waveguide 102 and output waveguide 103. The guiding direction is the direction along which the waveguides transmit light. In this example, the guiding direction of input waveguide 102 is from the left most surface (indicated by the left most arrow) towards the first interface 3201 in a direction generally perpendicular to the plane A-A'. The electro-optically active device can be described has having a trapezoidal geometry.

The first interface 3201 is the interface between the input region 104 of the input waveguide and the electro-optically active device 101. This first interface is at an angle α relative to the guiding direction of the input waveguide. α may take values of between 89° and 80°, and is in some examples 81°. Said another way, the vector of a plane coincident with the interface would be non-parallel with respect to the guiding direction of the input waveguide.

The second interface 3202 is the interface between the output region 105 of the output waveguide 103 and the electro-optically active device 101. This second interface is at an angle β relative to the direction of light through the device. β may take values of between 89° and 80°, and is in some cases 81°. Said another way, the vector of a plane coincident with the second interface would be non-parallel to the guiding direction of the output waveguide.

The angles α and β may be equal or may be different. In the example shown in FIG. 9, the angles are equal but have an opposite sense i.e. one is measured clock-wise and the other anti-clockwise such that they are not parallel. The interfaces may be parallel, and in which case they would have the same sense. It may be that only one of the angles has a value which is not equal to 90°.

Figure 10:
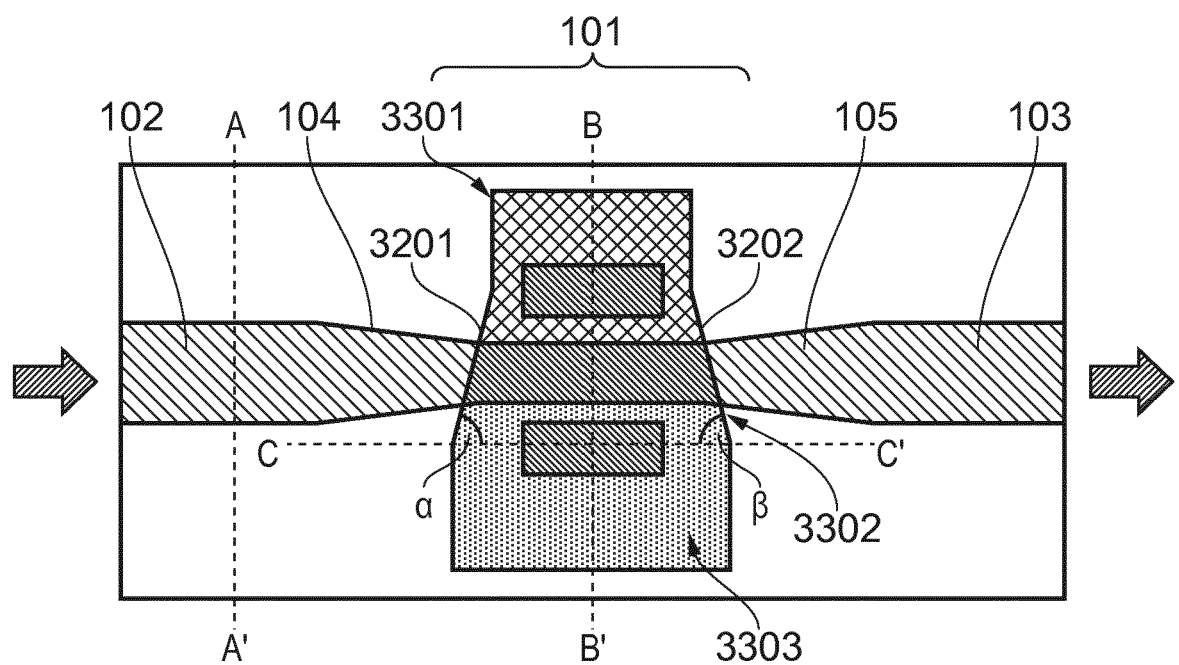
FIG. 10 shows a top down view of an electro-optically active device, also shown is an input waveguide with an input taper waveguide region and an output waveguide with an output waveguide taper region where a part of the electro-optically active device has a trapezoidal geometry.

A further embodiment of an electro-optically active device is shown in FIG. 10.

This embodiment differs from the embodiment shown in FIG. 9 in that, whilst a first interface 3201 and second interface 3202 are still angled relative to the line C-C', the entire geometry of the component is not trapezoidal. Instead, the electro-optically active device can be generally discussed as having three regions: a first and second rectangular region 3301 and 3303, and a trapezoidal region 3302 between the first and second rectangular regions. Therefore, the angled interfaces are provided by trapezoidal region 3302 whilst the first and second rectangular regions may provide electrical contacts that may be easier to form. In this embodiment the waveguide interfaces can be provided at non-perpendicular angles with respect to the direction of propagation of light through the device, and can also minimize the portion of the walls of the optically active material interface that are non-parallel to each other, and not parallel to the crystal planes of the Si wafer.

Figure 11:
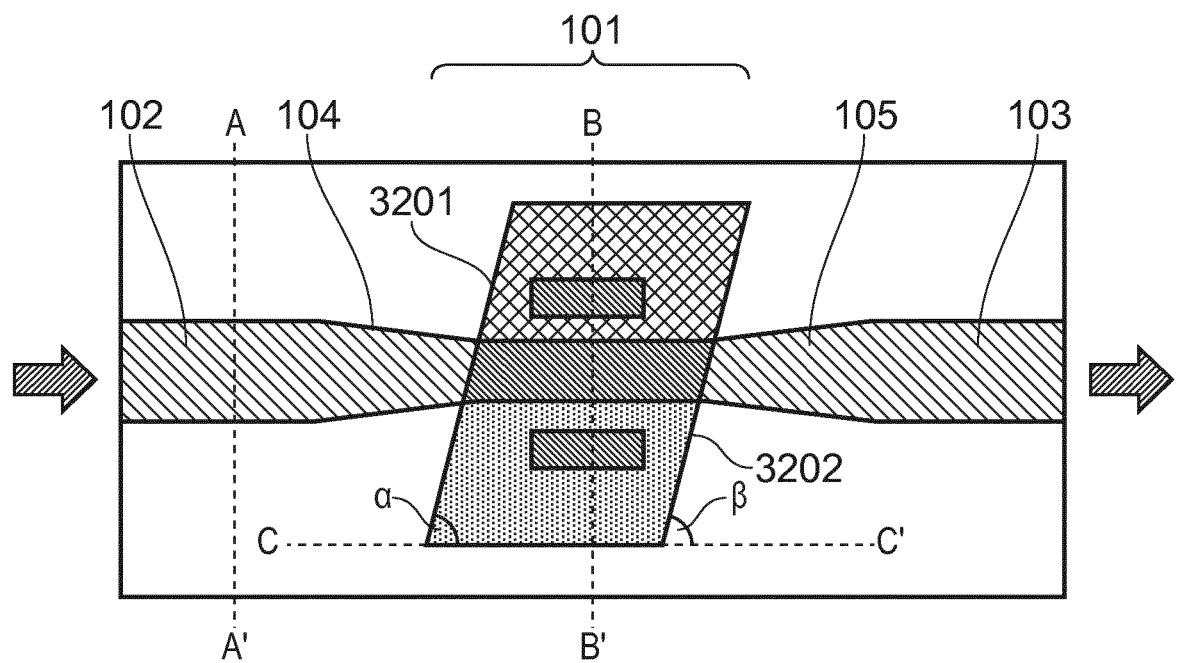
FIG. 11 shows a top down view of an electro-optically active device, also shown is an input waveguide with an input taper waveguide region and an output waveguide with an output waveguide taper region where the electro-optically active device has a parallelogramal geometry.

A further embodiment of an electro-optically active device is shown in FIG. 11.

This embodiment differs from the embodiments shown in FIG. 9 and FIG. 10 in that the electro-optically active device has a generally parallelogramal geometry. Therefore the first and second interface 3201 and 3202 are provided by the parallel sides of the parallelogram which intersect the first and second waveguide regions 104 and 105.

Figure 12:
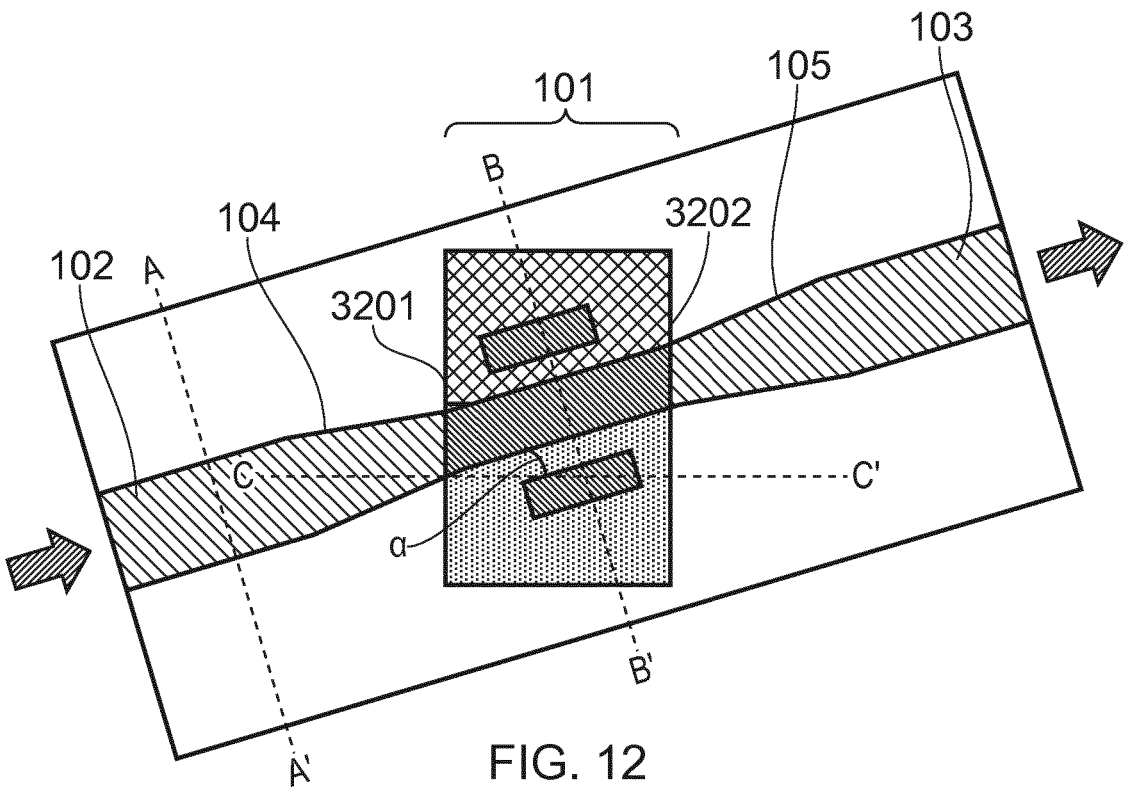
FIG. 12 shows a top down view of an electro-optically active device, also shown is an input waveguide with an input taper waveguide region and an output waveguide with an output waveguide taper region where the electro-optically active device has a rectangular geometry but has been disposed at an angle relative to the input and output waveguides.

A further embodiment of an electro-optically active device is shown in FIG. 12.

This embodiment differs from the embodiments shown in FIGS. 9-11 in that the electro-optically active device 101 has a generally rectangular geometry. However, the component 101 is disposed at an angle α relative direction C-C'. Therefore the two sides of the rectangle which intersect the first and second waveguide regions provide the first and second interfaces 3201 and 3202. In this variant, it may be necessary to rotate the wafer off of the normal angle (parallel to the Si wafer crystal planes) during the diode implantation steps. This can help to ensure that the implantation beam is incident uniformly along the waveguide in the optically active region.

Figure 13:
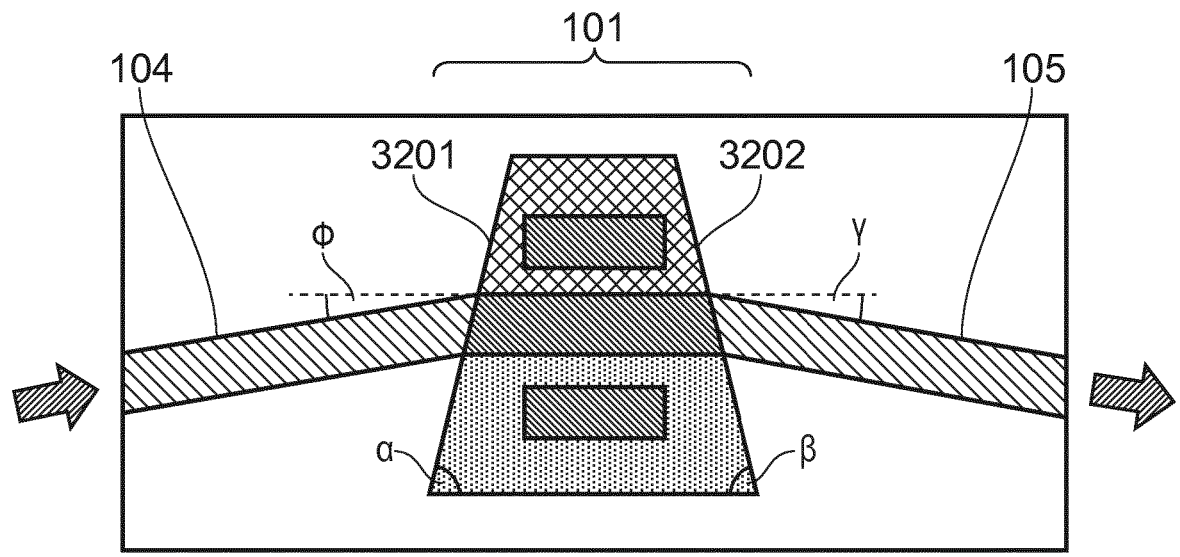
FIG. 13 shows a top down view of an electro-optically active device, also shown is an input waveguide and output waveguide which are disposed at angles φ and γ to the guiding direction of the OAR.

A further embodiment of an electro-optically active device is shown in FIG. 13.

This embodiment differs from embodiments shown previously in that the input waveguide 104 and output waveguide 105 are disposed at respective angles ϕ and γ to the guiding direction of the electro-optically active stack (the guiding direction of the electro-optically active stack being parallel to line C-C').

Figure 14:
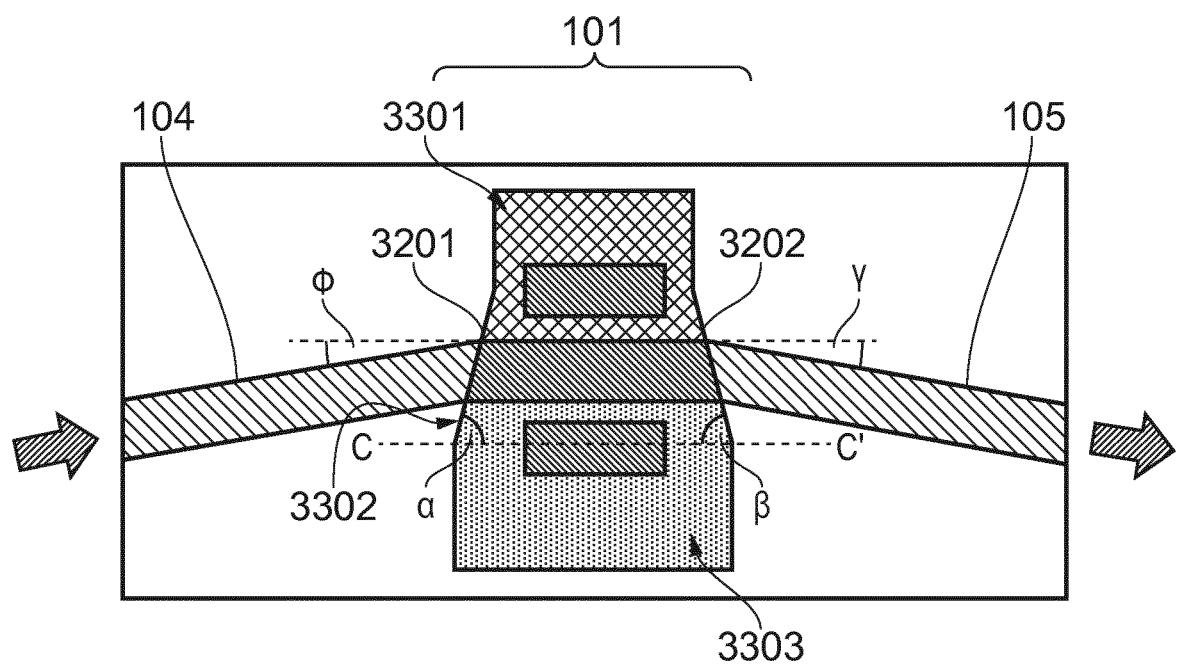
FIG. 14 shows a top down view of an electro-optically active device, also shown is an input waveguide and output waveguide which are disposed at angles φ and γ to the guiding direction of the OAR.

A further embodiment of an electro-optically active device is shown in FIG. 14.

This embodiment differs from that shown in FIG. 13 in that it can be described as having generally three regions: a first and second rectangular region 3301 and 3303, and a trapezoidal region 3302 between the first and second rectangular regions. Therefore, the angled interfaces are provided by trapezoidal region 3302 whilst the first and second rectangular regions may provide electrical contacts that may be easier to form. In this embodiment the waveguide interfaces can be provided at non-perpendicular angles with respect to the direction of propagation of light through the device, and can also minimize the portion of the walls of the optically active material interface that are non-parallel to each other, and not parallel to the crystal planes of the Si wafer.

Figure 15:
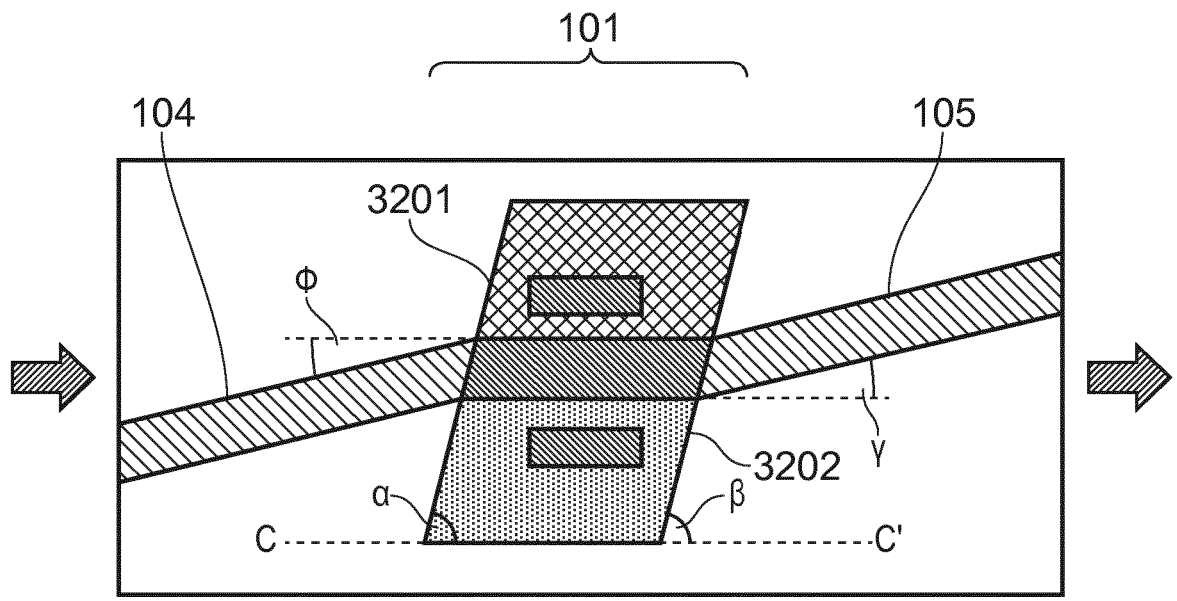
FIG. 15 shows a top down view of an electro-optically active device, also shown is an input waveguide and output waveguide which are disposed at angles ϕ and γ to the guiding direction of the OAR and are arranged such that their guiding directions are parallel.

A further embodiment of an electro-optically active device is shown in FIG. 15.

This embodiment differs from the embodiments shown in FIGS. 13 and 14 in that the electro-optically active device has a generally parallelogramal geometry (as viewed from above). Therefore, the first and second interfaces 3201 and 3202 are provided by the parallel sides of the parallelogram which intersects the first and second waveguides 104 and 105.

Figure 16:
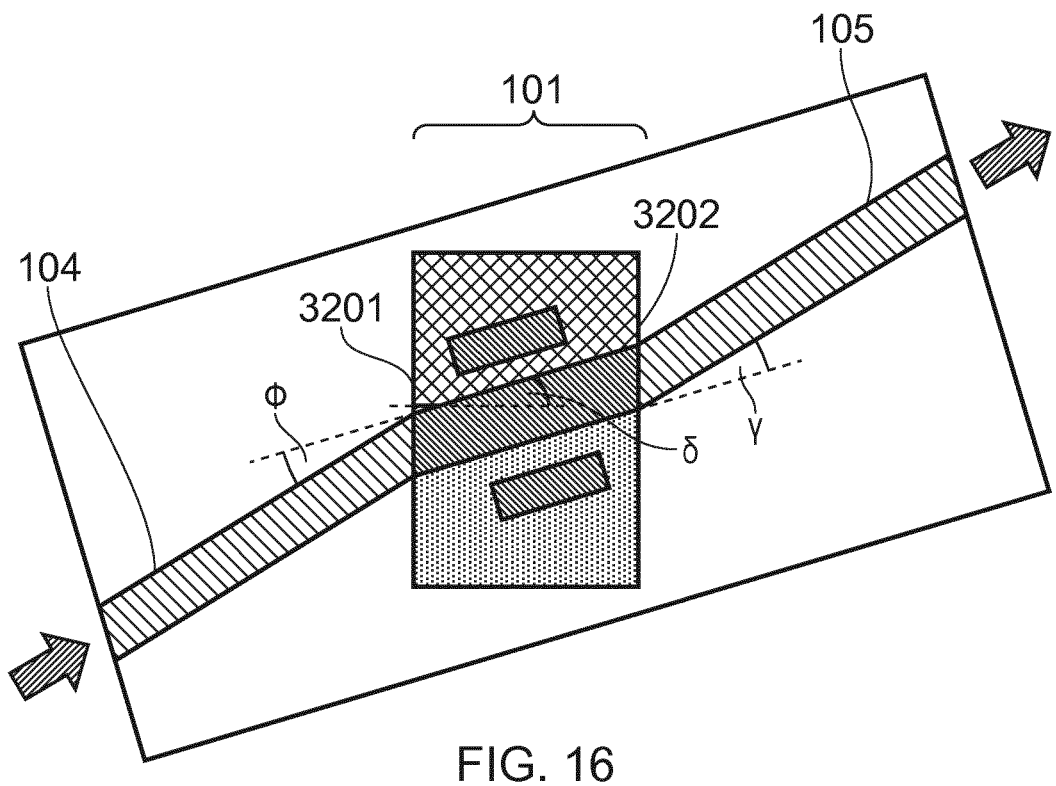
FIG. 16 shows a top down view of an electro-optically active device, also shown is an input waveguide and output waveguide which are disposed at angles ϕ and γ to the guiding direction of the OAR and are arranged such that their guiding directions are parallel and the entire component has been rotated by an angle δ relative to a global horizontal.

A further embodiment of an electro-optically active device is shown in FIG. 16.

This embodiment differs from the embodiment shown in FIG. 15 in that the electro-optically active device 101 has a generally rectangular geometry. However, the component 101 is disposed at an angle δ relative to a guiding direction of the electro-optically active stack (this indicated by the dotted line labeled δ). Therefore, the two sides of the rectangle which intersect the first and second waveguides provide the first and second interfaces 3201 and 3202.

In the embodiments discussed above, the angled interfaces may extend beyond the waveguide. For example, the angled interfaces 3201 and 3202 in FIG. 16 extend beyond a width of the waveguide.

Figure 17:
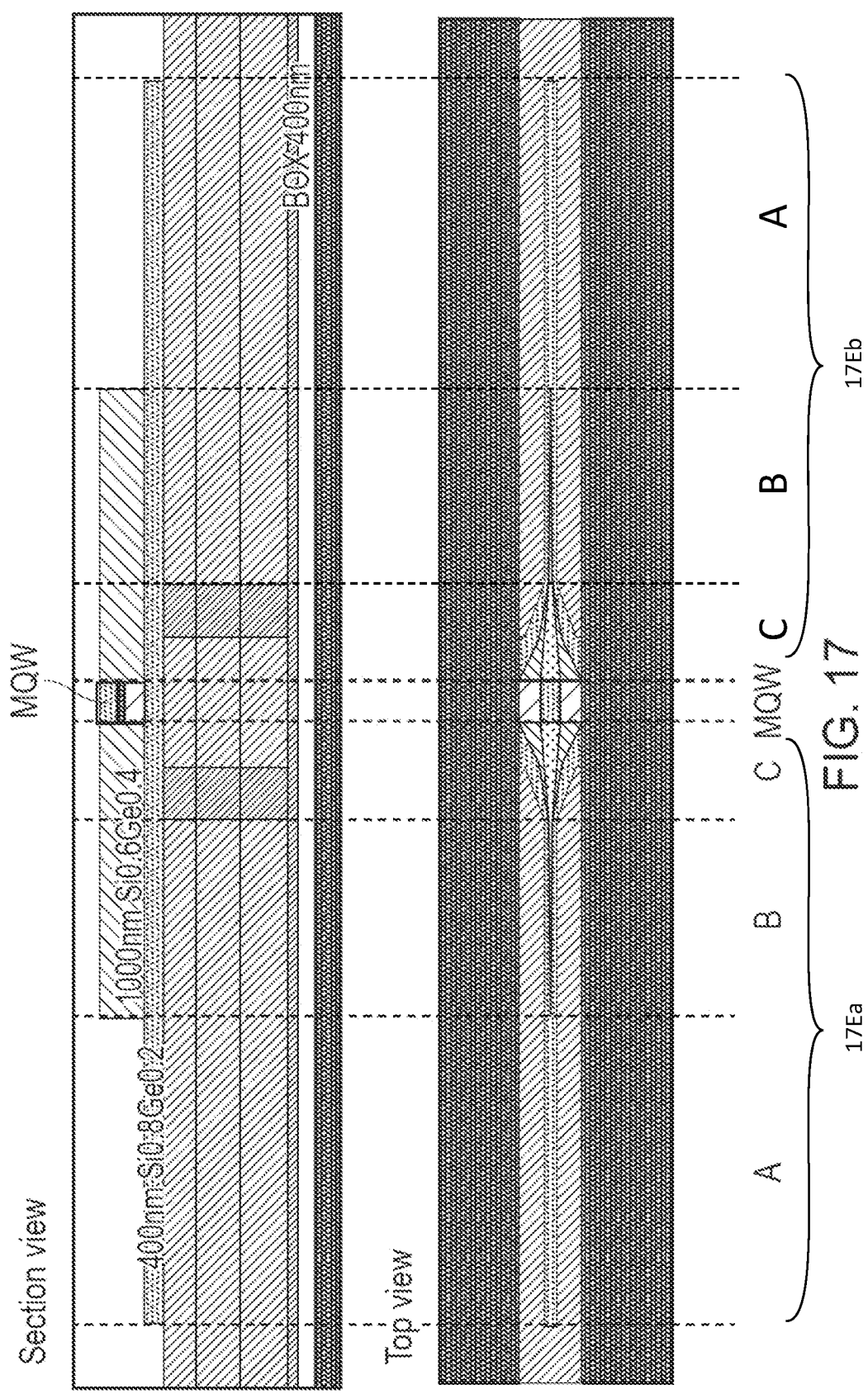
FIG. 17 shows a cross-sectional view, and top view, of an optoelectronic device.

FIG. 17 shows another embodiment of an optoelectronic device. The upper part of FIG. 17 shows a cross-sectional view of the device structure along the light propagation direction comprising SOI waveguide and sections A, B, C and MQW. FIG. 17 also shows an evanescent coupling structure, comprising a first evanescent coupling structure 17Ea on a left side of the MQW and a second evanescent coupling structure 17Eb on a right side of the MQW. The device structure is built on 3 μm SOI with 400 nm BOX layer thickness. The light is input from the left side of SOI waveguide, goes up to the transit layer waveguide, section A, made of $Si_{0.8}Ge_{0.2}$ with 400 nm thickness by evanescent coupling, then the light goes up again to the first passive waveguide, section B, made of $Si_{0.6}Ge_{0.4}$ with 1 μm thickness by evanescent coupling, then light from the first passive waveguide enters the section C, a taper structure made of $Si_{0.6}Ge_{0.4}$ with 1 μm thickness to enlarge the first passive waveguide optical mode to match that of the MQW active region. After section C, the light is edge coupled to the SiGe MQW active region where the light is modulated. The light from the SiGe MQW active region is edge coupled to the right side section C, then goes to the second passive waveguide section B and goes down to the right side transit layer waveguide section A by evanescent coupling and back to the Sal waveguide by evanescent coupling in reverting order. The lower part of FIG. 17 shows the top-down view of the device structure.

Detailed device structure parameters are shown in table 1, where section D is the MQW active region. In the second column of table 1, the width (begin) and width (end) indicate the waveguide's width at the beginning side and the end side corresponding to each section in the length row. For example, in the column A section, the A section comprises 8 segments with a total length of 104 μm. The first segment has a length of 5 μm with beginning waveguide width of 0.8 μm and an end waveguide width of 0.9 μm; and the second segment has a length of 10 μm with beginning waveguide width of 0.9 μm and an end waveguide width of 1 μm; and so on for each other segments in section A, and for other sections.

TABLE 1

Detailed device structure parameters

| | | SOI region | A<br>Transit waveguide coupling region | B<br>Buffer waveguide coupling region | C<br>Mode expander region | D<br>2.5 um Active region | Total |
|---|---|---|---|---|---|---|---|
| Length (um) | | 10 | 5/10/13/13/11/17/<br>23/12 = 104 um | 21/44/19/<br>14 = 96 um | 6/16/<br>20 = 42 um | 40 um | 524 |
| SOI waveguide | Width (begin) | 2.6 | 2.6 | 2.6 | 2.6 | 150* | |
| | Width (end) | 2.6 | 2.6 | 2.6 | 10 | 150* | |
| Transit waveguide | Width (begin) | | 0.8/0.9/1.0/1.1/1.2/1.3/1.4/1.5 | 1.6 | 1.5 | 150* | |
| | Width (end) | | 0.9/1.0/1.1/1.2/1.3/1.4/1.5/1.6 | 1.6 | 10 | 150* | |
| buffer & P_layer waveguide | Width (begin) | | | 0.3/0.4/0.5/0.6 | 0.7/1.0/2.0 | 150* | |
| | Width (end) | | | 0.4/0.5/0.6/0.7 | 1/2.0/2.5 | 150* | |
| MQW waveguide | Width (begin) | | | | 2.5 | 40 | |
| coupling efficiency (FDTD) | | | 0.985 | 0.938 | 0.978 | 0.936 | 0.846 |

Figure 18:
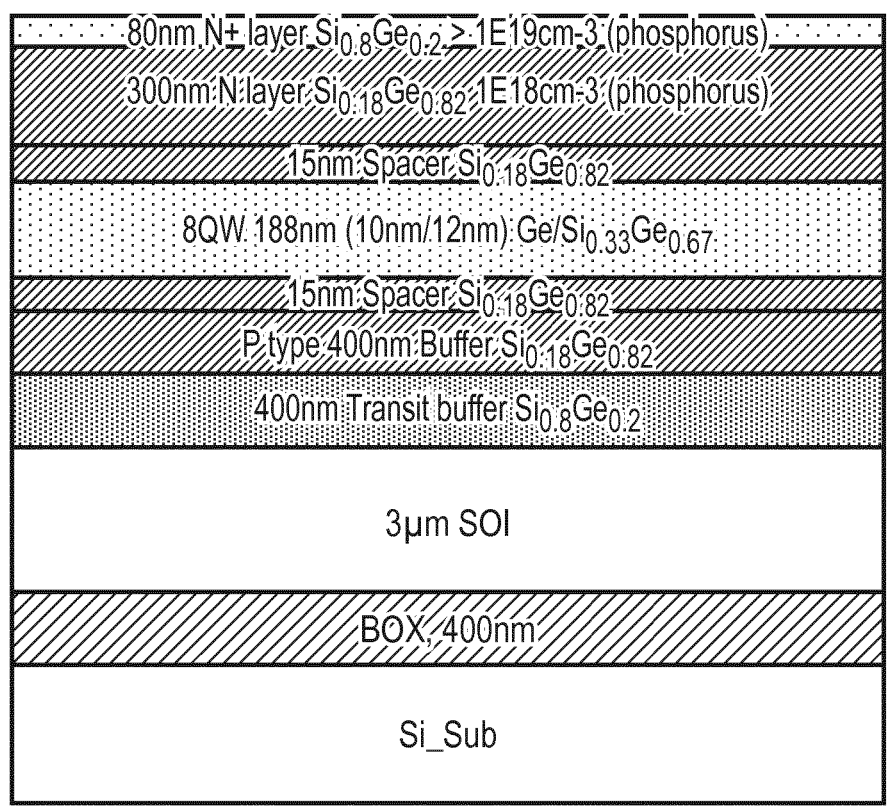
FIG. 18 shows a cross-sectional view of the stack structure used in the device shown in FIG. 17.
Figure 19A:
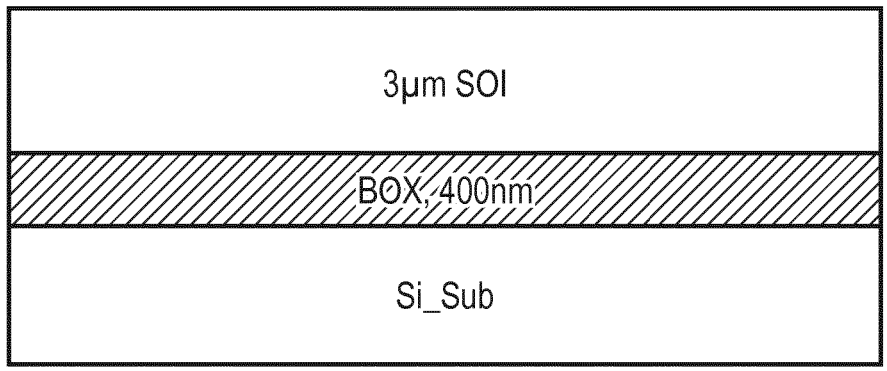
FIG. 19A 19S show the fabrication process flow of the device shown in FIG. 17.

FIG. 18 shows the SiGe MQW EPI structure on 3 μm SOI with 400 nm BOX layer. The EPI structure comprises (from bottom to top) a 400 nm $Si_{0.8}Ge_{0.2}$ transit or transition layer, which can be either P-type doped or intentionally undoped. In this embodiment, this layer is intentionally undoped. A 400 nm $Si_{0.18}Ge_{0.82}$ P-type doped buffer layer with a dopant concentration of $1\times10^{18}$ cm$^{-3}$, which is also the so-called virtual substrate layer since this layer determines the strain in the multiple quantum wells; a 15 nm $Si_{0.18}Ge_{0.82}$ spacer layer; a 188 nm layer of 8 quantum wells with each quantum well comprising 10 nm Ge well and 12 nm $Si_{0.33}Ge_{0.67}$ barrier; another 15 nm $Si_{0.18}Ge_{0.82}$ spacer layer; a 300 nm $Si_{0.18}Ge_{0.82}$ N-type doped layer with a dopant concentration of $1\times10^{19}$ cm$^{-3}$; and a 80 nm $Si_{0.8}Ge_{0.2}$ heavily N-type doped layer with a dopant concentration of $>1\times10^{19}$ cm$^{-3}$. The P-type dopant is boron and the N-type dopant is phosphorus. FIG. 19A 19S show the fabrication process steps of the device. The 400 nm buffer layer, both 15 nm spacer layers, and the 300 nm N-type doped layer may be formed of a $Si_{0.38}Ge_{0.62}$ composition.

FIG. 19A shows the SOI wafer on which the device is fabricated. On silicon substrate, there is a layer of 400 nm buried silicon oxide layer (BOX layer), on which a layer of 3 μm silicon overlay is built.

Figure 19B:
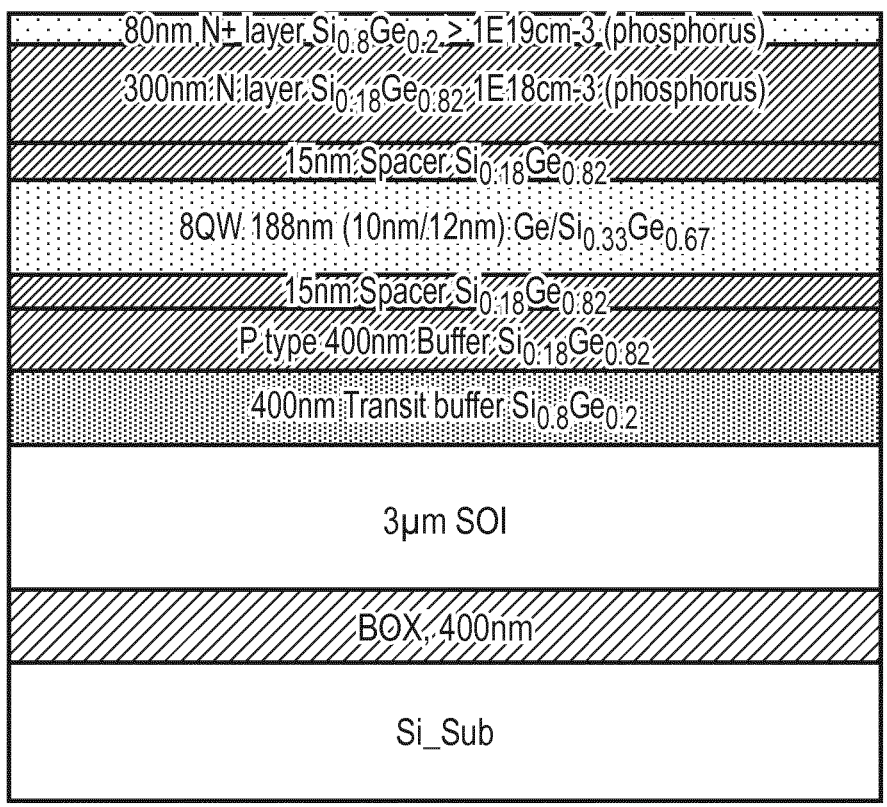

FIG. 19B shows the structure after SiGe MQW epitaxial growth.

Figure 19C:
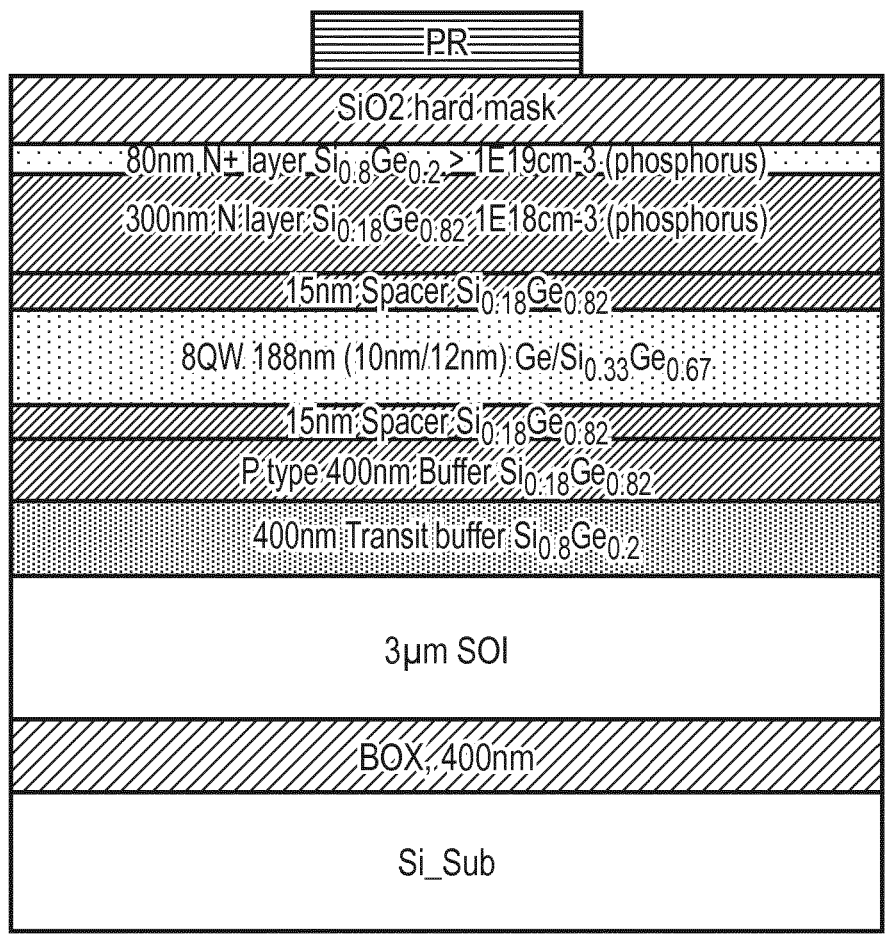

In FIG. 19C, a layer of SiO$_2$ hard mask is deposited by PECVD, followed by the lithography patterning of the MQW active mesa.

Figure 19D:
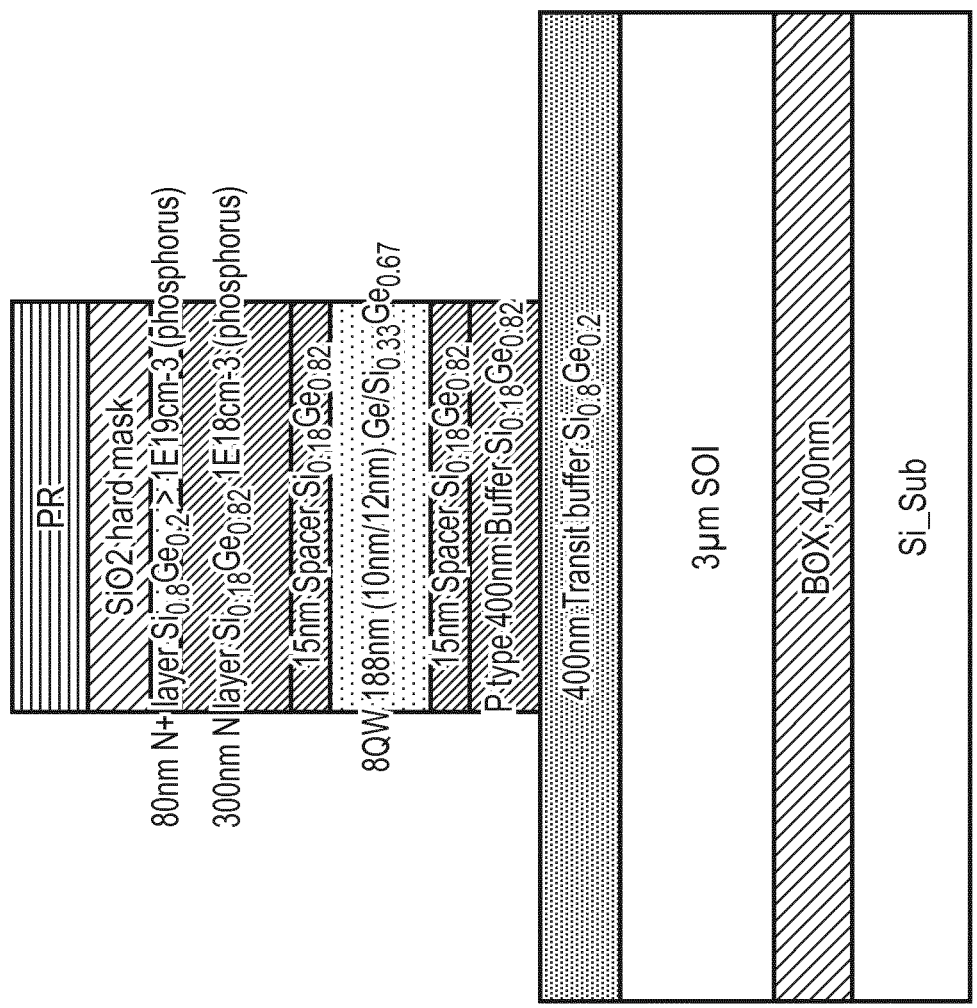
Figure 19E:
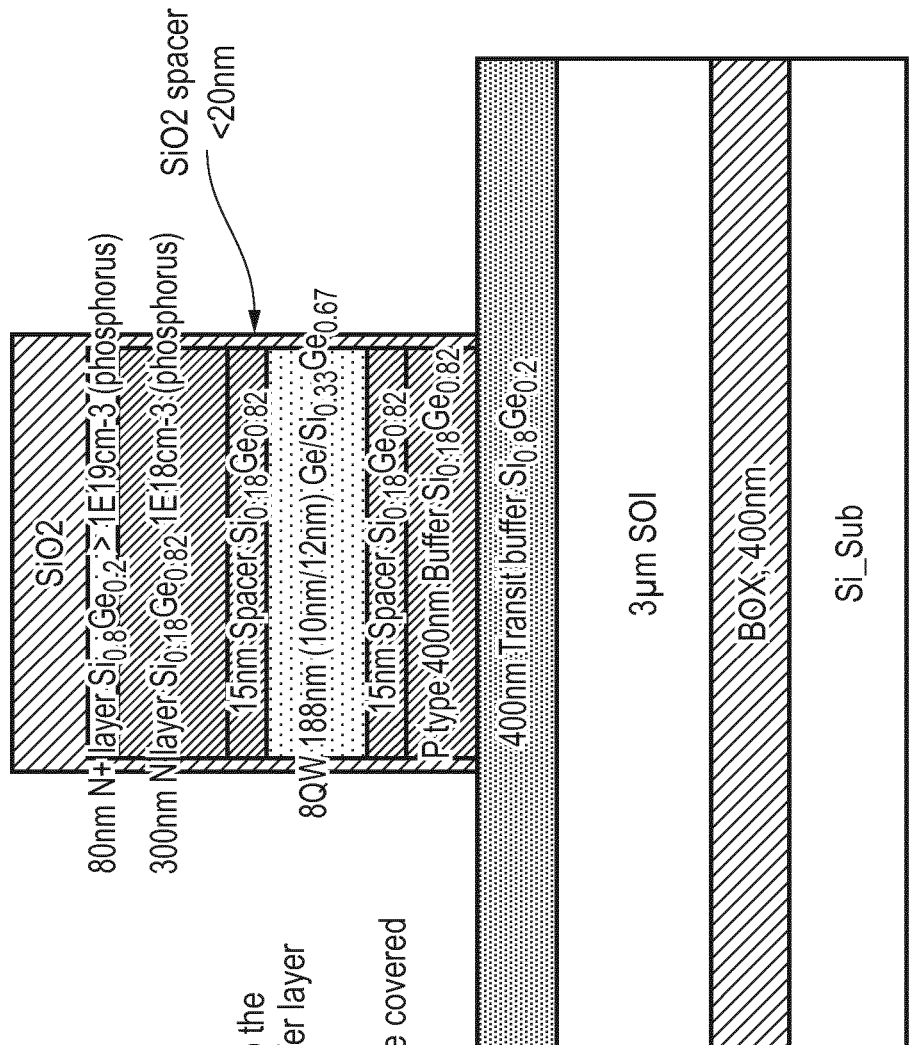

In FIG. 19D, the MQW active mesa is dry etched to the surface of the $Si_{0.8}Ge_{0.2}$ transit buffer layer. The edges of the MQW active mesa in the light propagation direction may have an angle that is described from FIG. 9 to FIG. 16. After the mesa etching, a layer of less than 20 nm SiO$_2$ spacer may be deposited on to the mesa edge facets for later epitaxial growth, which is shown in FIG. 19E. This SiO$_2$ spacer layer is optional.

Figure 19F:
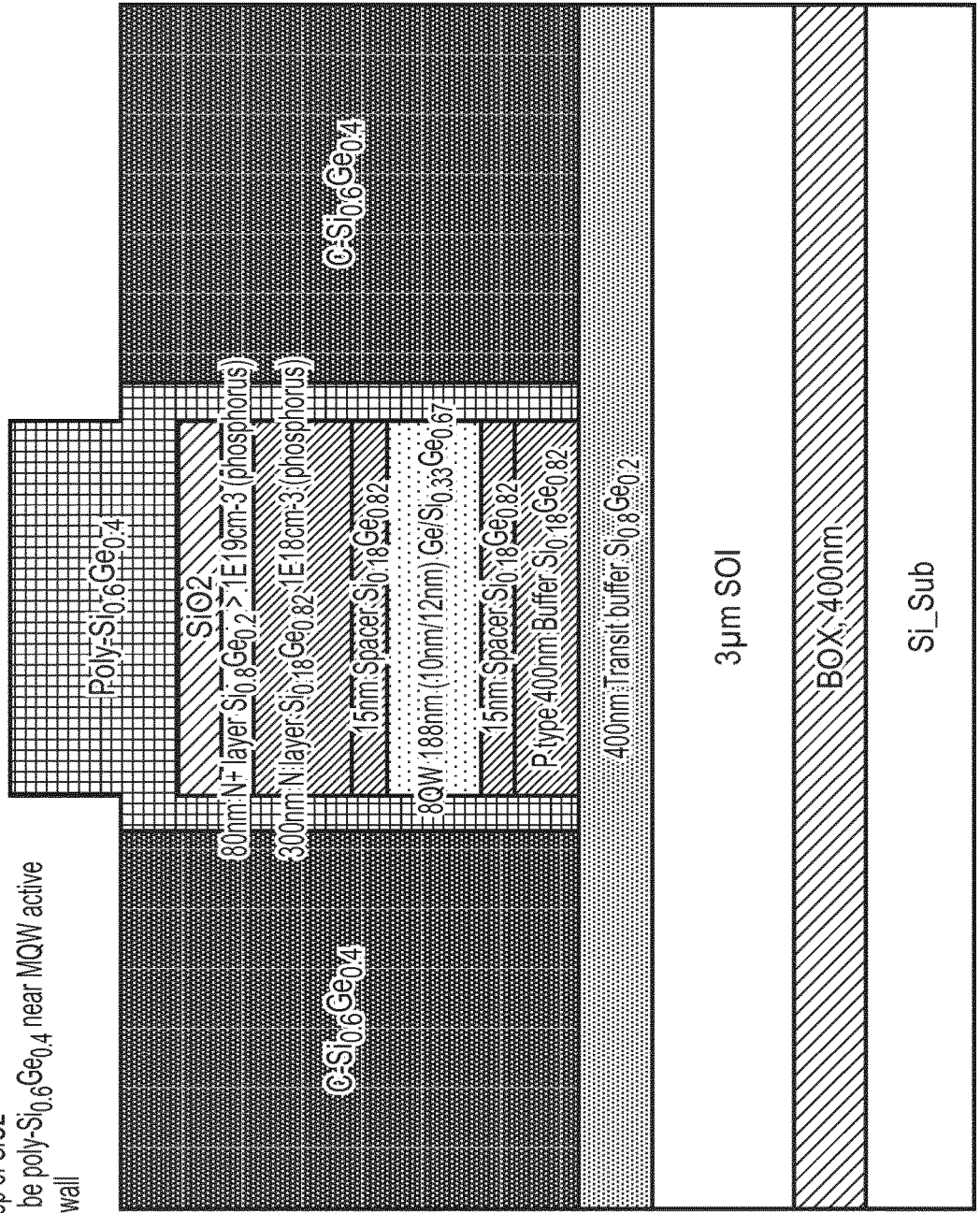

In FIG. 19F, a layer of crystalline bulk $Si_{0.6}Ge_{0.4}$ is epitaxially grown. The methods of the epitaxial growth can be either selective growth, or blanket growth, or Low Energy PECVD (LEPECVD) method. If it is by LEPECVD method, there is a layer of polycrystalline on top of the mesa as well as near the edge facets of the mesa, which is shown in FIG. 19F.

Figure 19G:
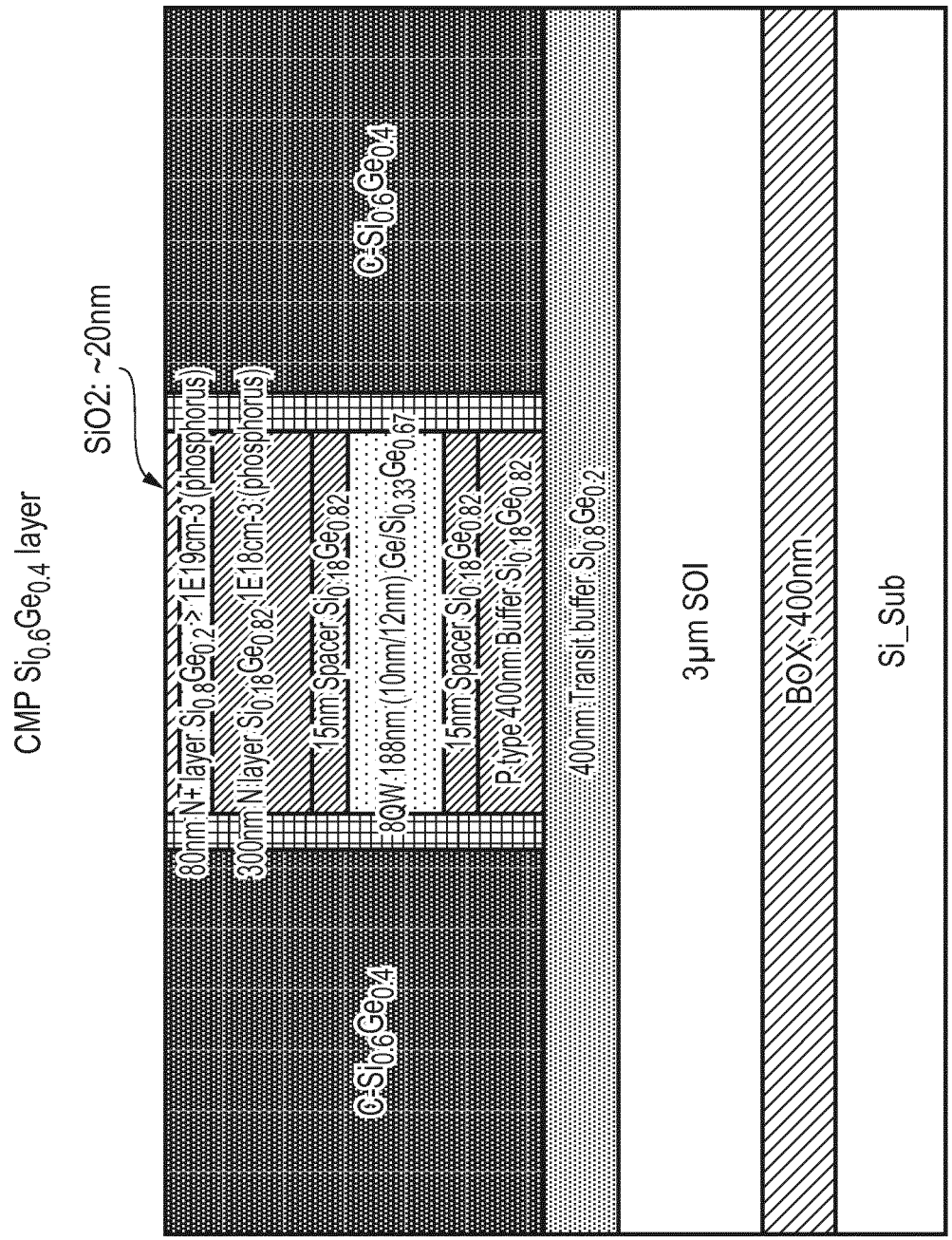
Figure 19H:
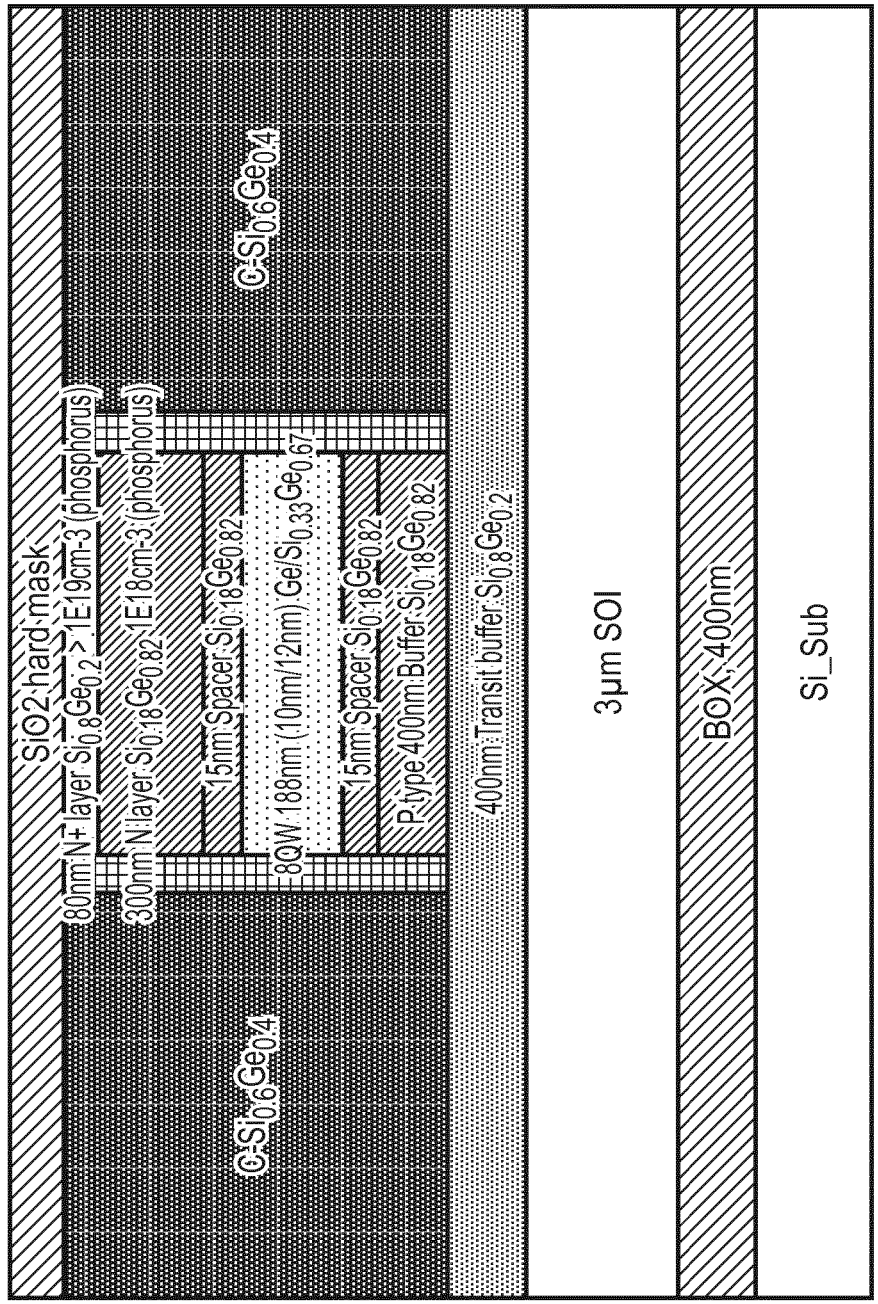

After epitaxial growth, a CMP process is performed to planarize the surface in which about 20 nm SiO2 is left on top of the mesa, which is shown in FIG. 19G. After the CMP process, a layer of SiO2 hard mask is deposited for the waveguide fabrication, which is shown in FIG. 19H.

Figure 19I:
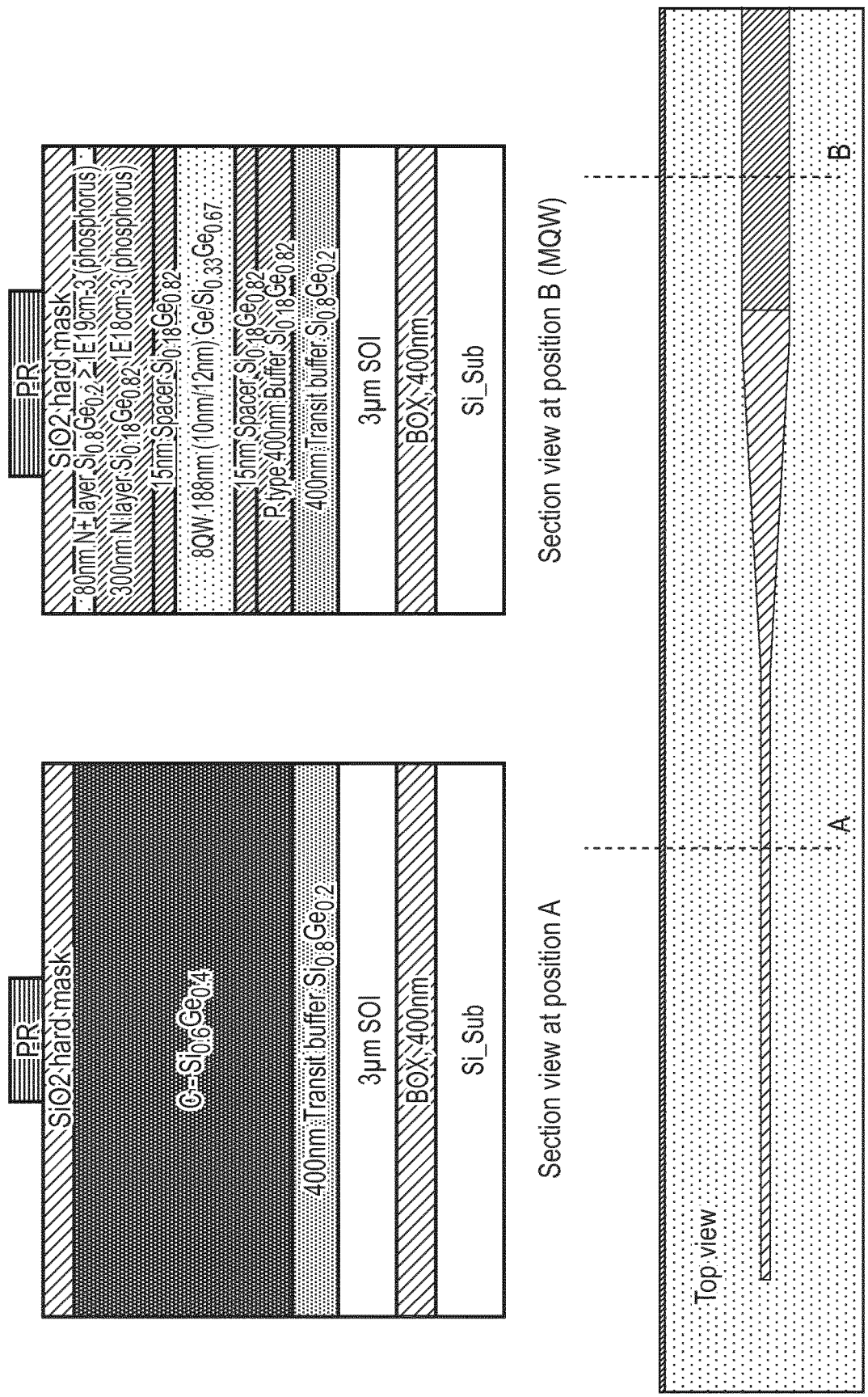

FIG. 19I shows the lithographical patterning results of MQW waveguide, the first and second passive waveguides and the taper structures of $Si_{0.6}Ge_{0.4}$. The lower part of FIG. 19I shows the top view of the patterning results for half of the device structure, and the upper part of FIG. 19I shows the section views at positions A and B in the lower part of FIG. 19I.

Figure 19J:
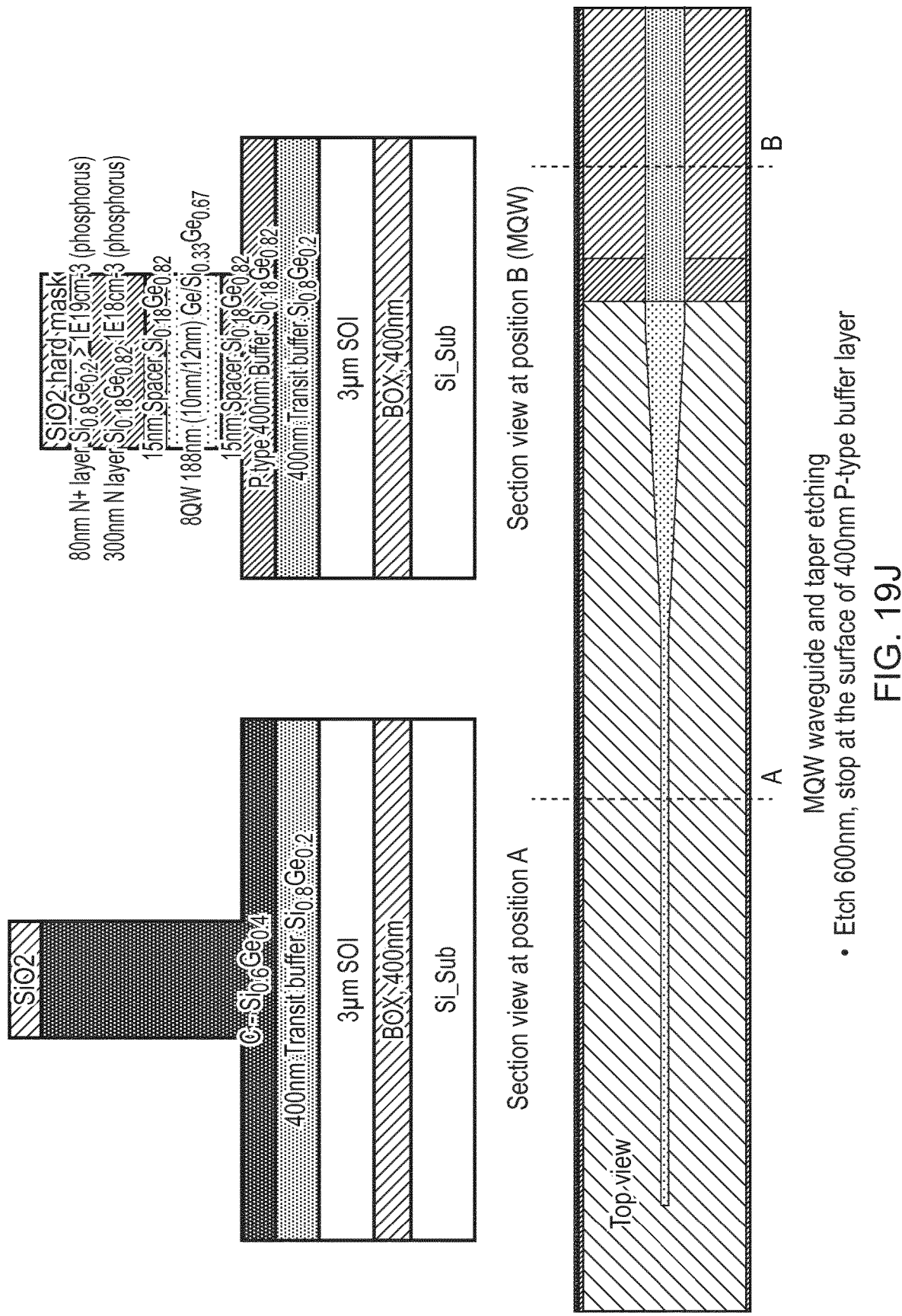

FIG. 19J shows the results after dry etching process. The etching process stops at the surface of the P-type doped $Si_{0.38}Ge_{0.82}$ buffer layer in the MQW EPI structure region, and in the epitaxial growth region a 600 nm $Si_{0.6}Ge_{0.4}$ top part is etched away with 400 nm left on the bottom part. The lower part of FIG. 19J shows the top view after dry etching, and the upper part of FIG. 19J shows the section views after etching at positions A and B in the lower part of FIG. 19J.

Figure 19K:
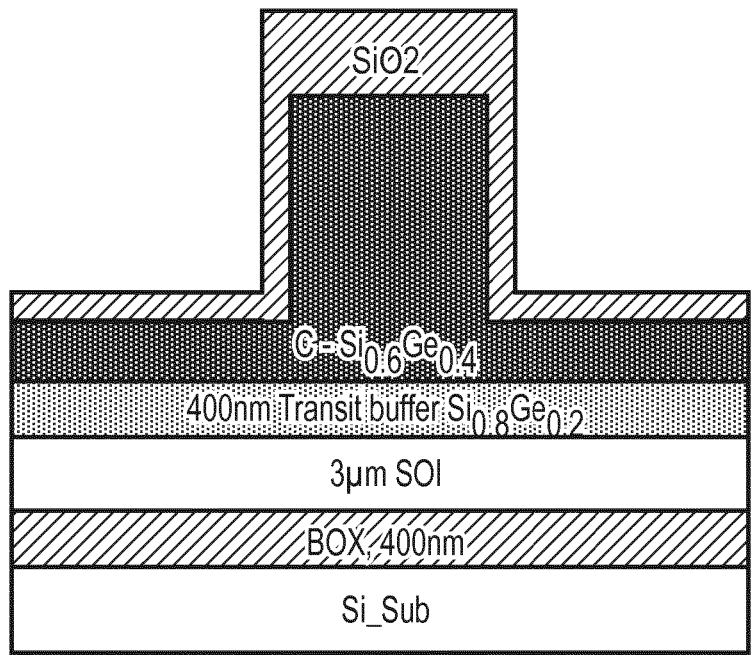
Figure 19K:
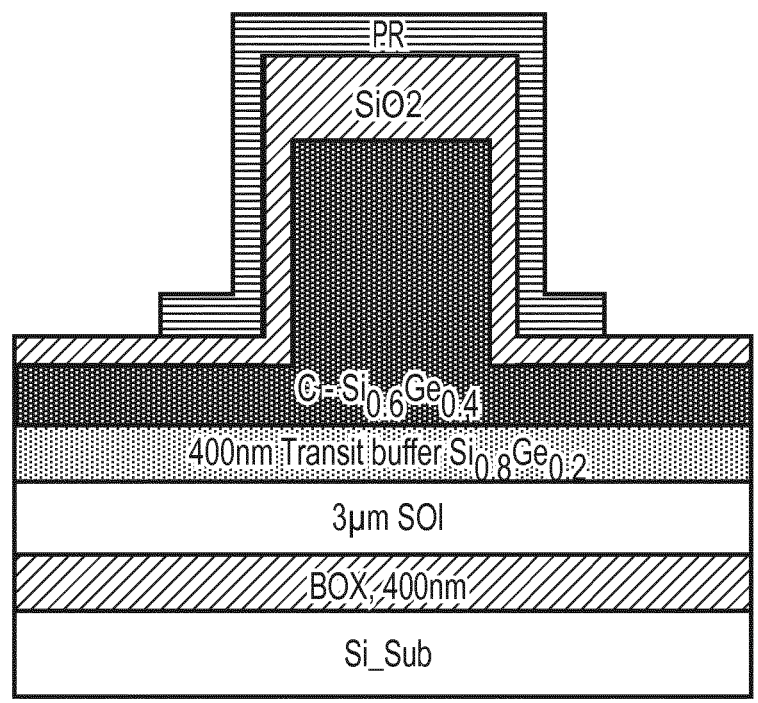
Figure 19K:
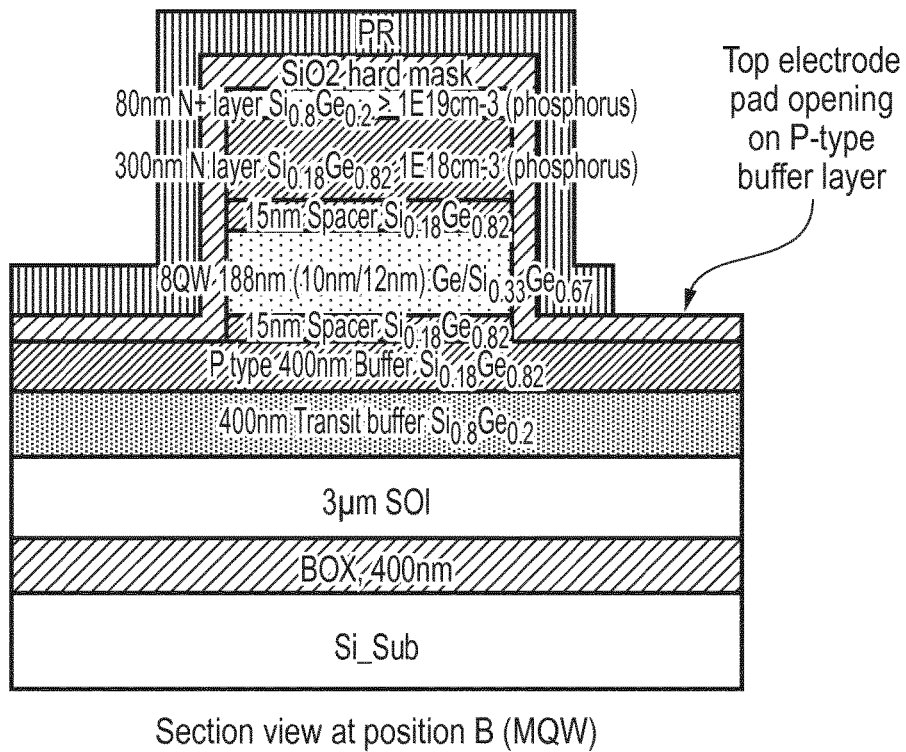
Figure 19K:
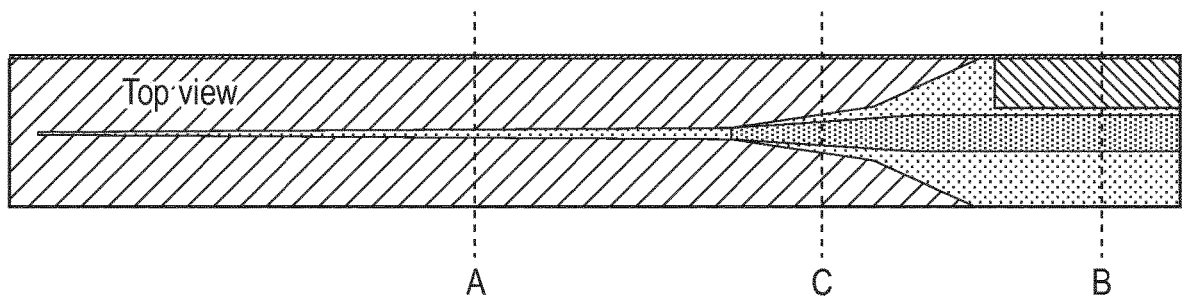

After the etching process of FIG. 19J, a layer of SiO$_2$ hard mask is deposited. Since there is a layer of SiO$_2$ left from the dry etching process, the SiO$_2$ hard mask on top of the waveguide is thicker than that in the areas other than the waveguide top. A photolithography process is followed to define the top electrode pad opening and the taper slab areas, which is shown in FIG. 19K (position B and C in the lower part of FIG. 19K). Since there is no slab for the first and second passive waveguides of $Si_{0.6}Ge_{0.4}$ (as shown in the lower part of FIG. 19K at position A), there is no photoresist on top of the first and second passive waveguides to realize self-alignment between the first passive waveguide and the taper structure, as well as between the second passive waveguide and the taper structure (not shown in FIG. 19K due to symmetrical reason) because of the thicker SiO$_2$ hard mask on top of the waveguide. The lower part of FIG. 19K shows the top view after the lithography process, and the upper part of FIG. 19K shows the section views at positions A, B and C. At position A, there is no photoresist on top of waveguide to realize self-alignment.

Figure 19L:
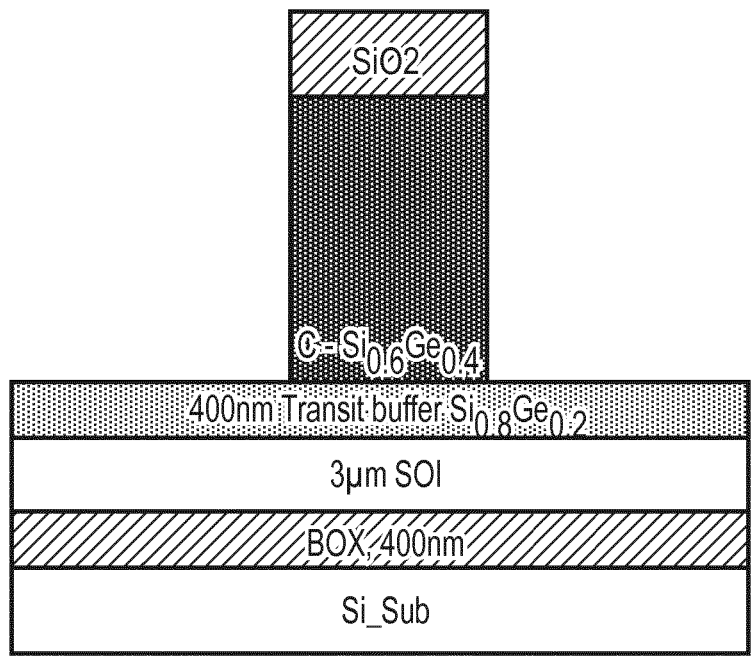
Figure 19L:
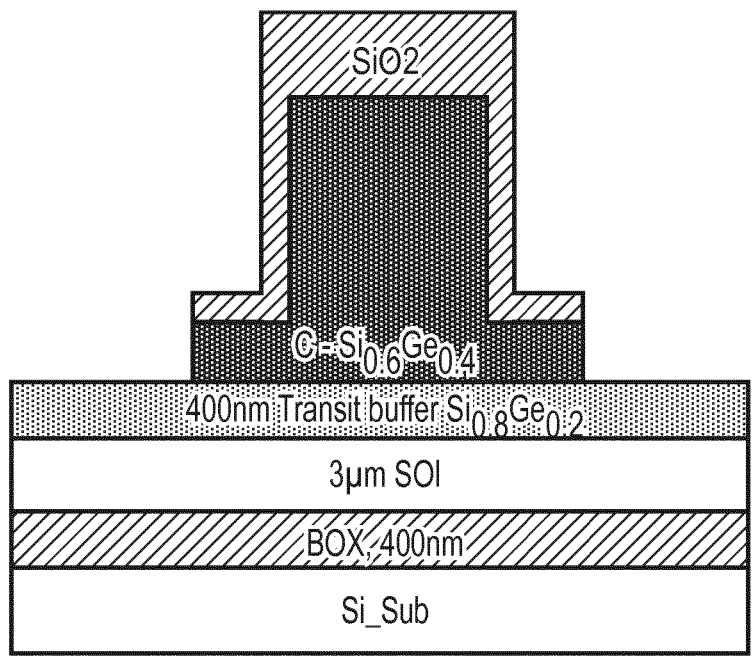
Figure 19L:
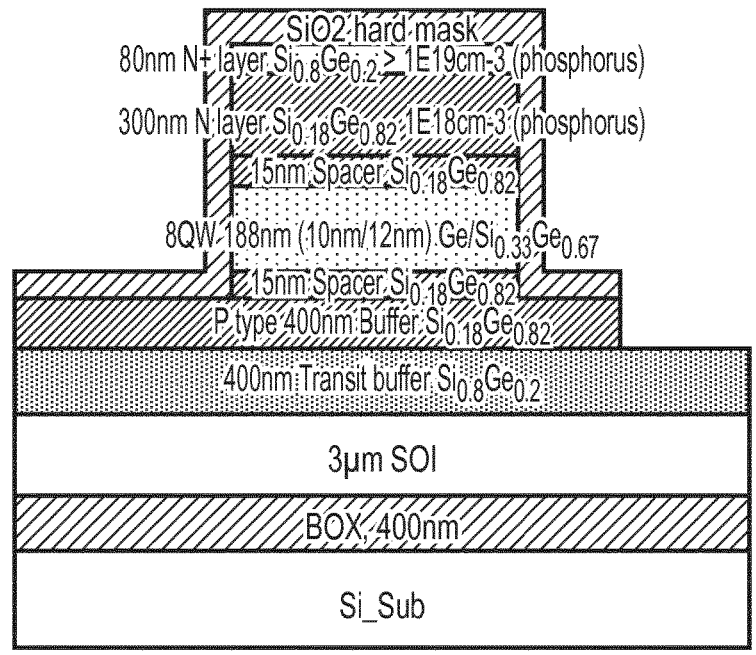
Figure 19L:
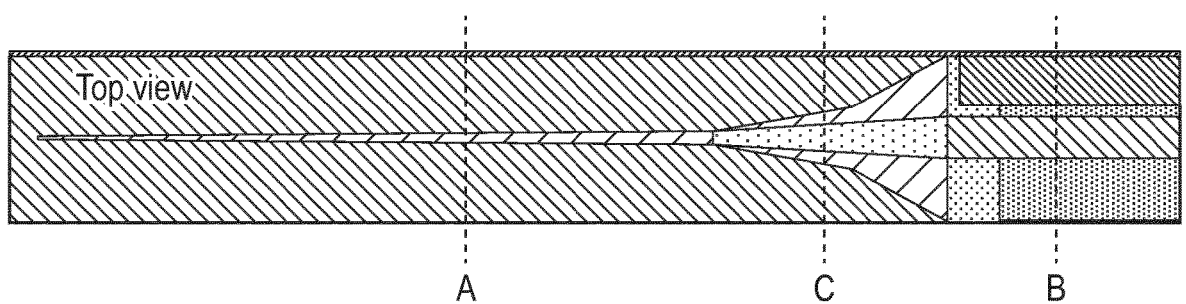

FIG. 19L shows the results after dry etching process. The dry etching process stops at the surface of the 400 nm $Si_{0.8}Ge_{0.2}$ transit buffer layer. The lower part of FIG. 19L shows the top view and the upper part of FIG. 19L shows the section views at position A, B and C.

Figure 19M:
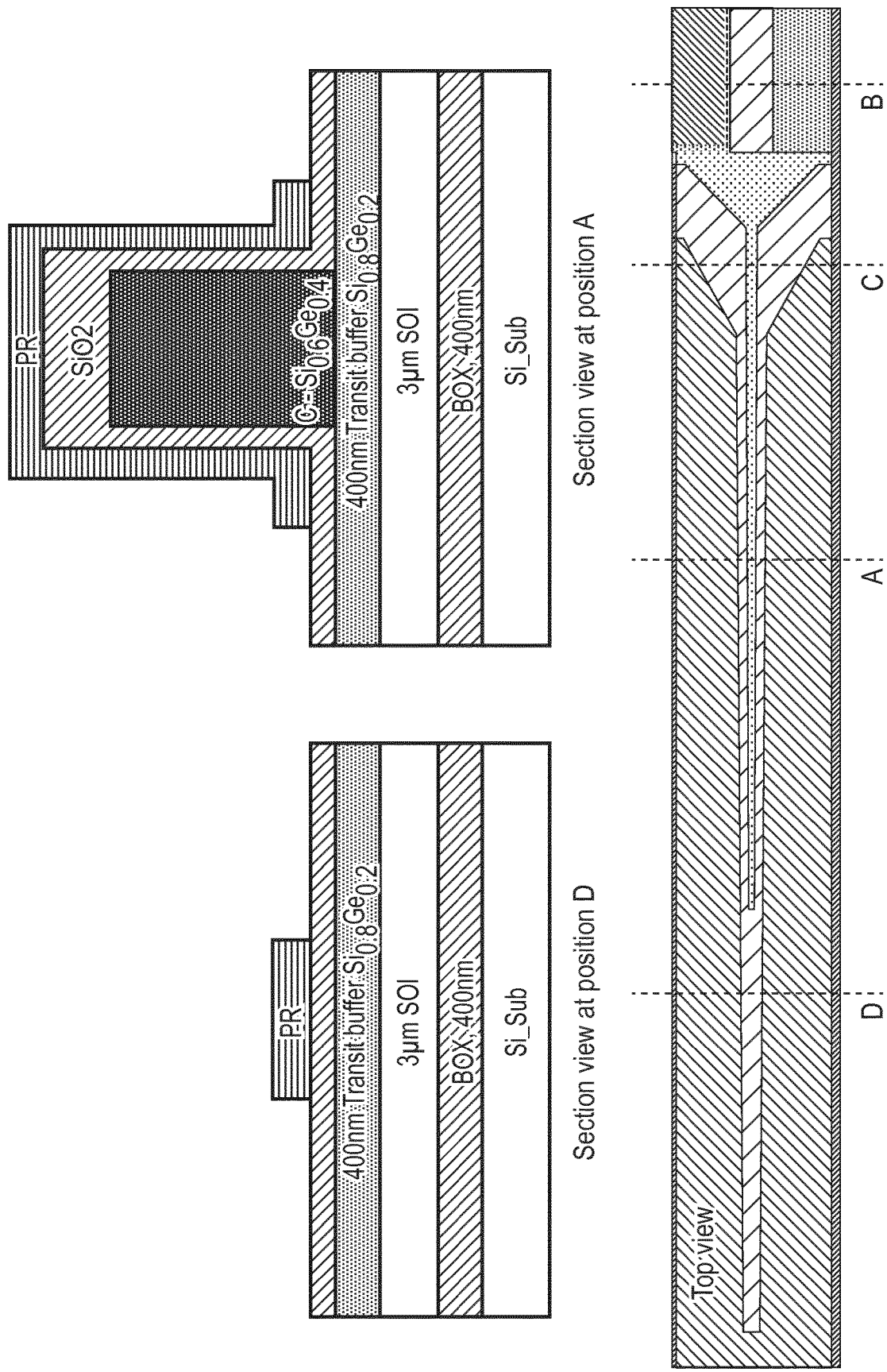
Figure 19M:
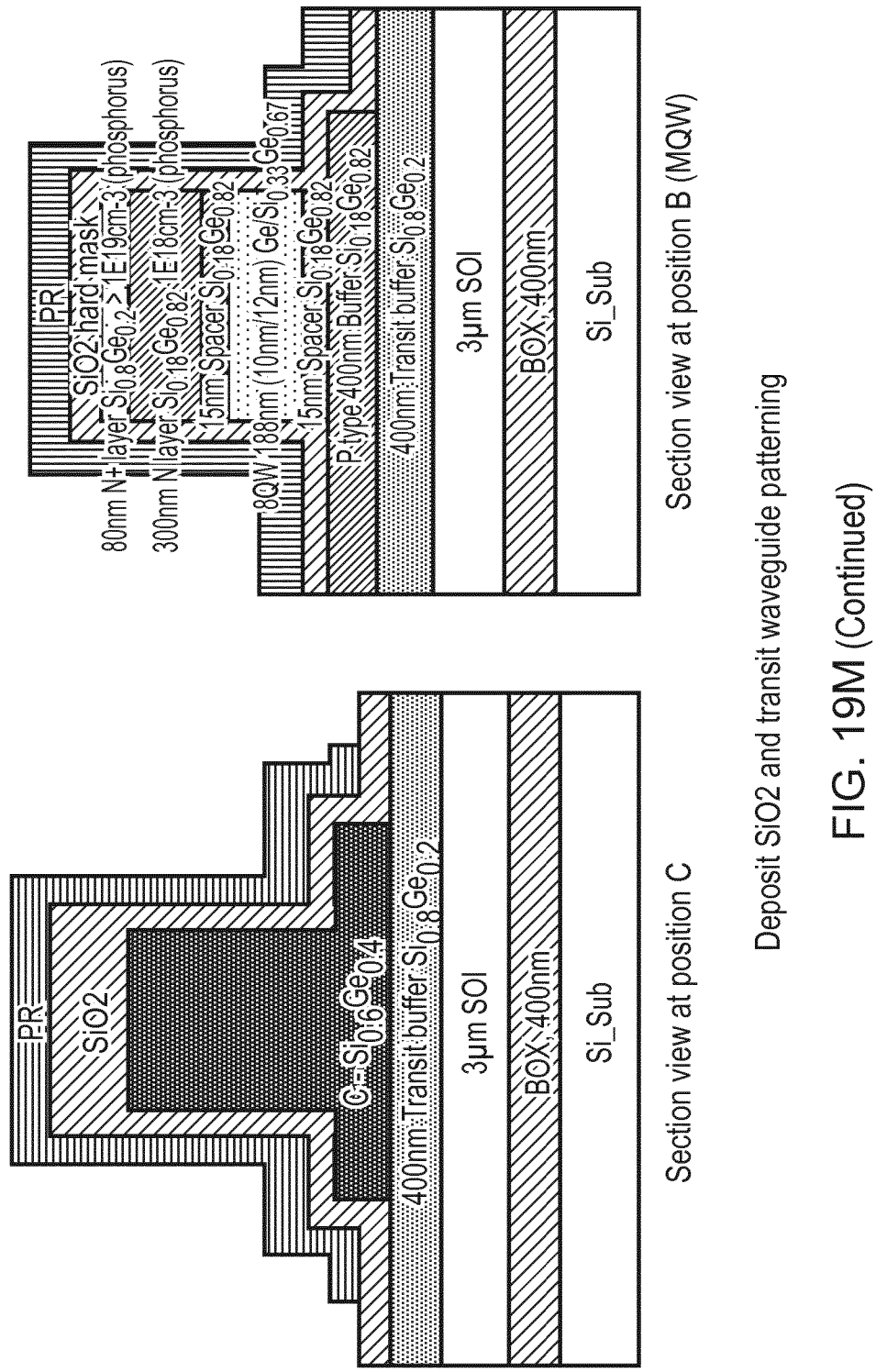

After the dry etching process, a layer of SiO$_2$ hard mask is deposited for the transit waveguide etching process. The transit waveguide patterning process is shown in FIG. 19M. The lower part of FIG. 19M shows the top view of transit waveguide patterning, and the upper part of FIG. 19M shows the sections views at positions A, B, C and D.

Figure 19N:
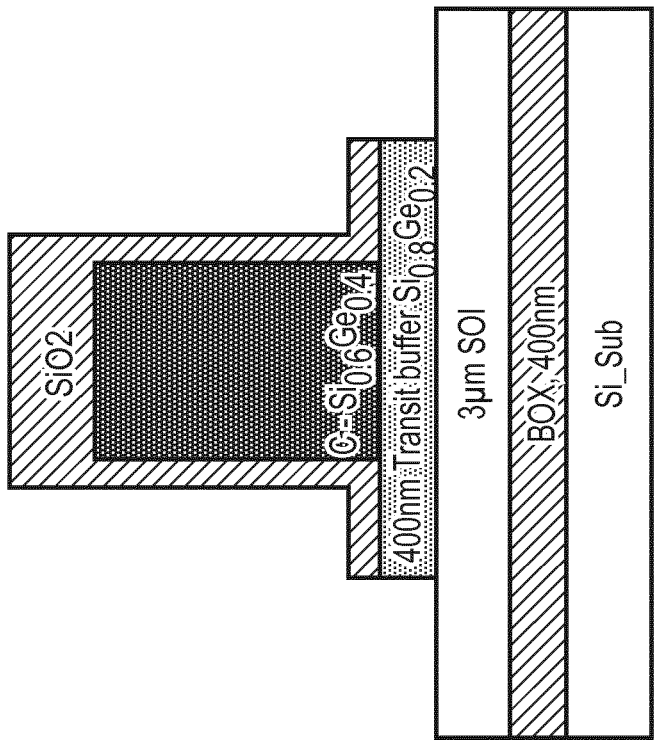
Figure 19N:
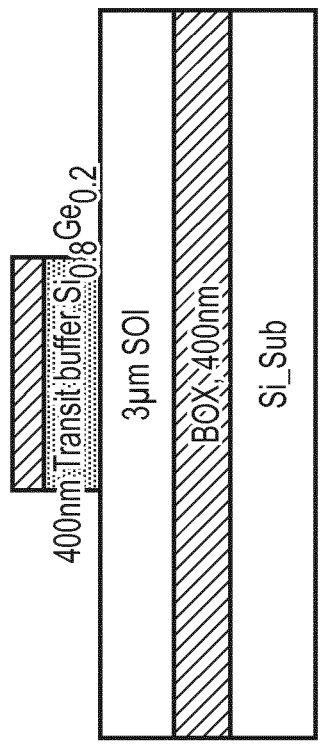
Figure 19N:
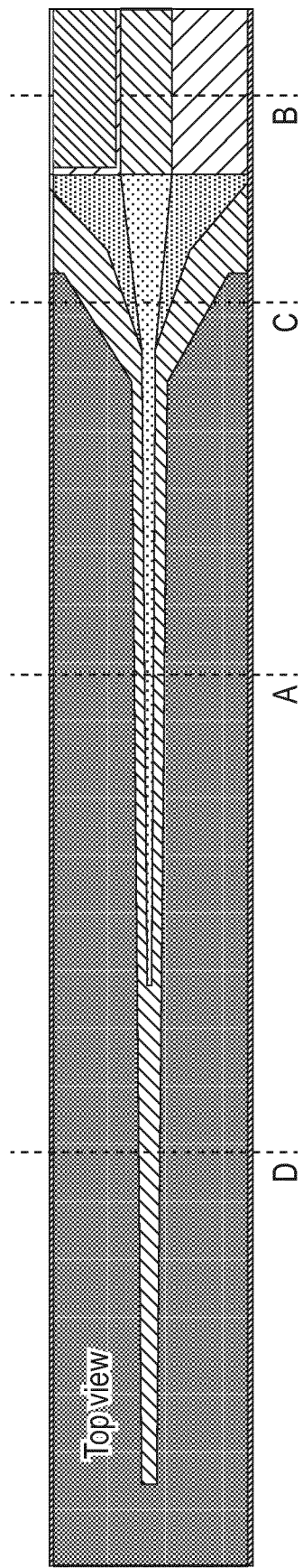
Figure 19N:
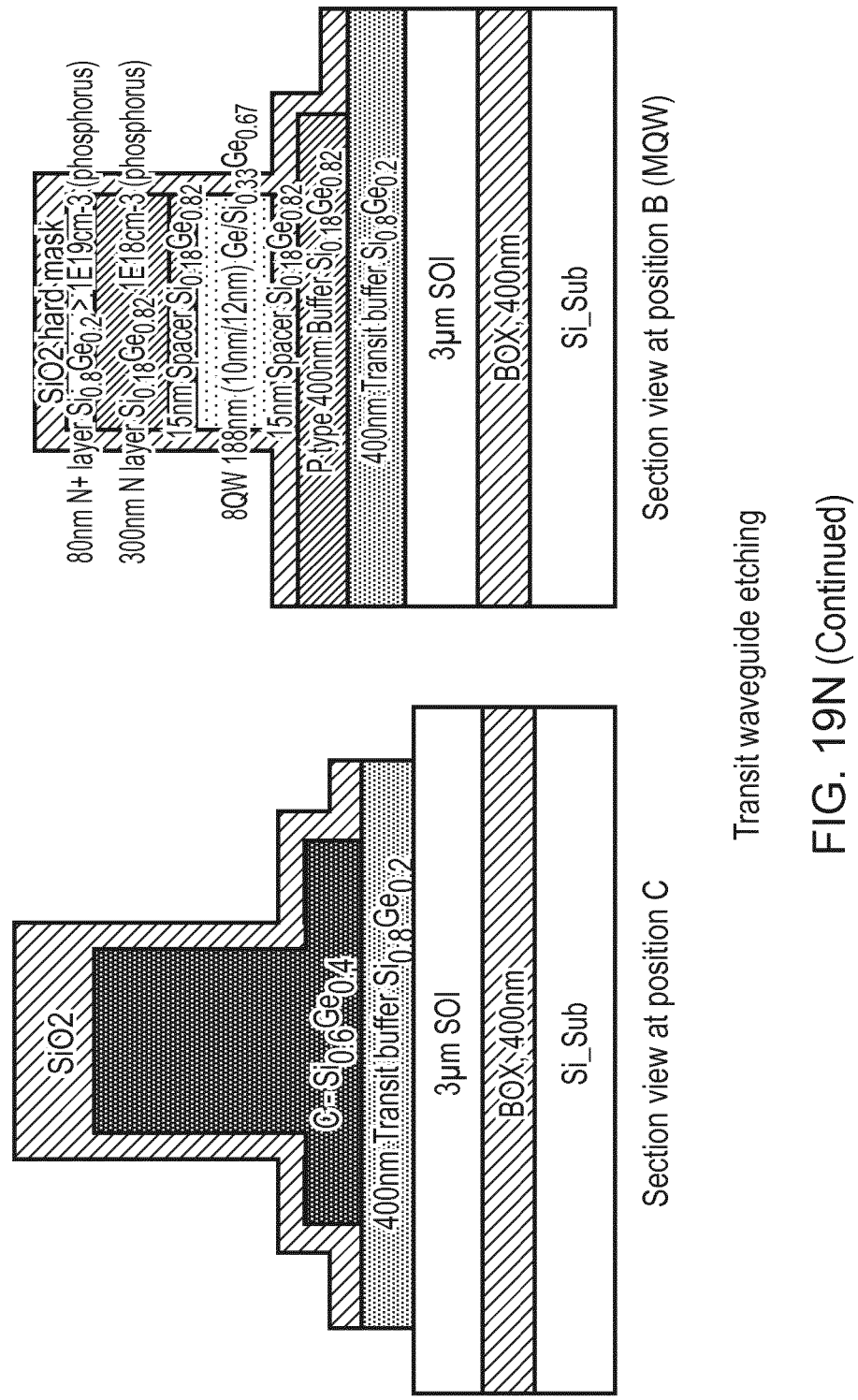

FIG. 19N shows the results after dry etching process. The dry etching process stops at the surface of the 3 μm SOL The lower part of FIG. 19N shows the top view after the transit waveguide etching, and the upper part of FIG. 19N shows the sections views at positions A, B, C and D.

Figure 19O:
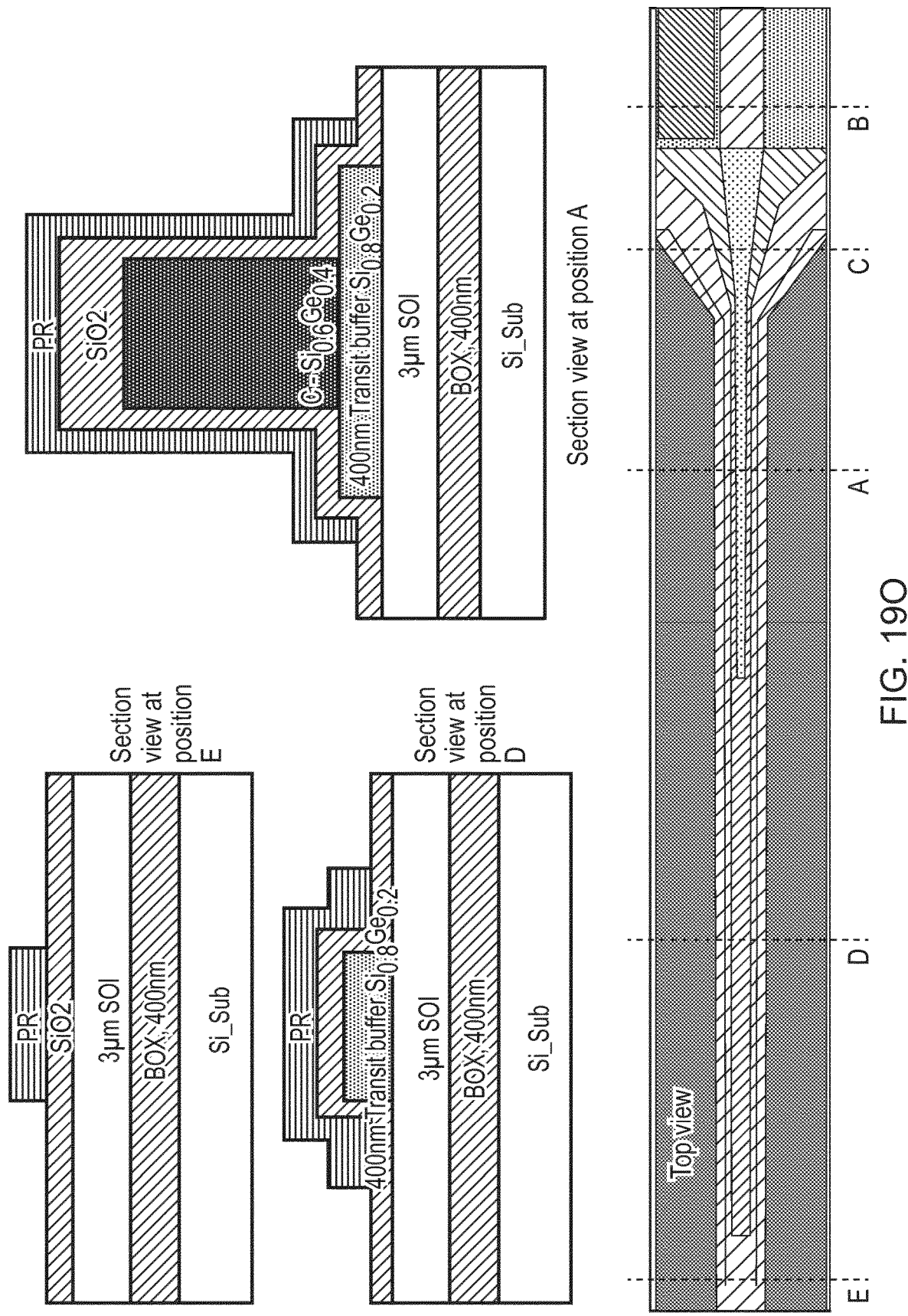
Figure 19O:
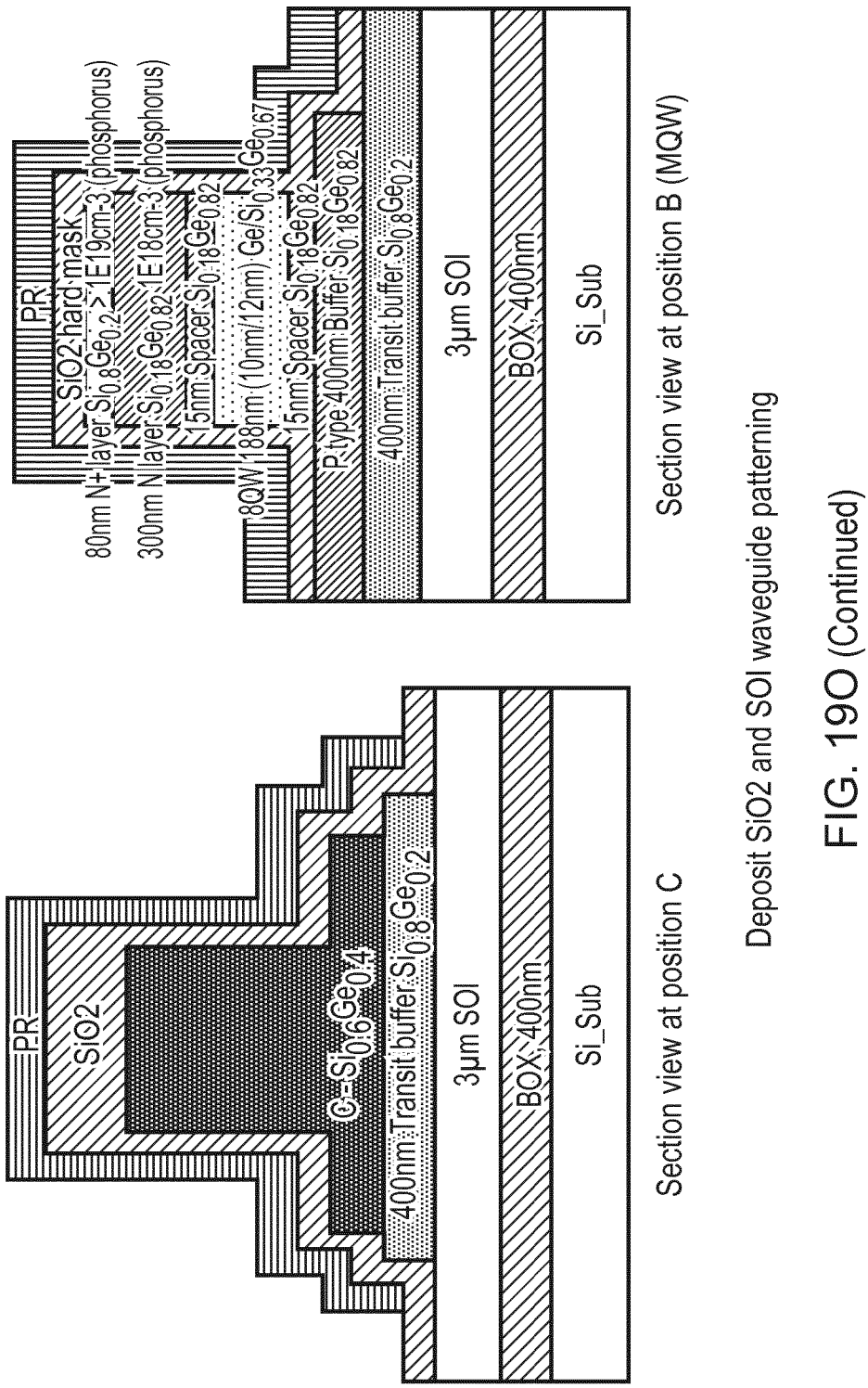

After transit waveguide etching, a layer of SiO$_2$ hard mask is deposited for SOI waveguide fabrication process, followed by the SOI waveguide patterning process. The lower part of FIG. 19O shows the top view of SOI waveguide patterning, and the upper part of FIG. 19O shows the section views at positions A, B, C, D and E.

Figure 19P:
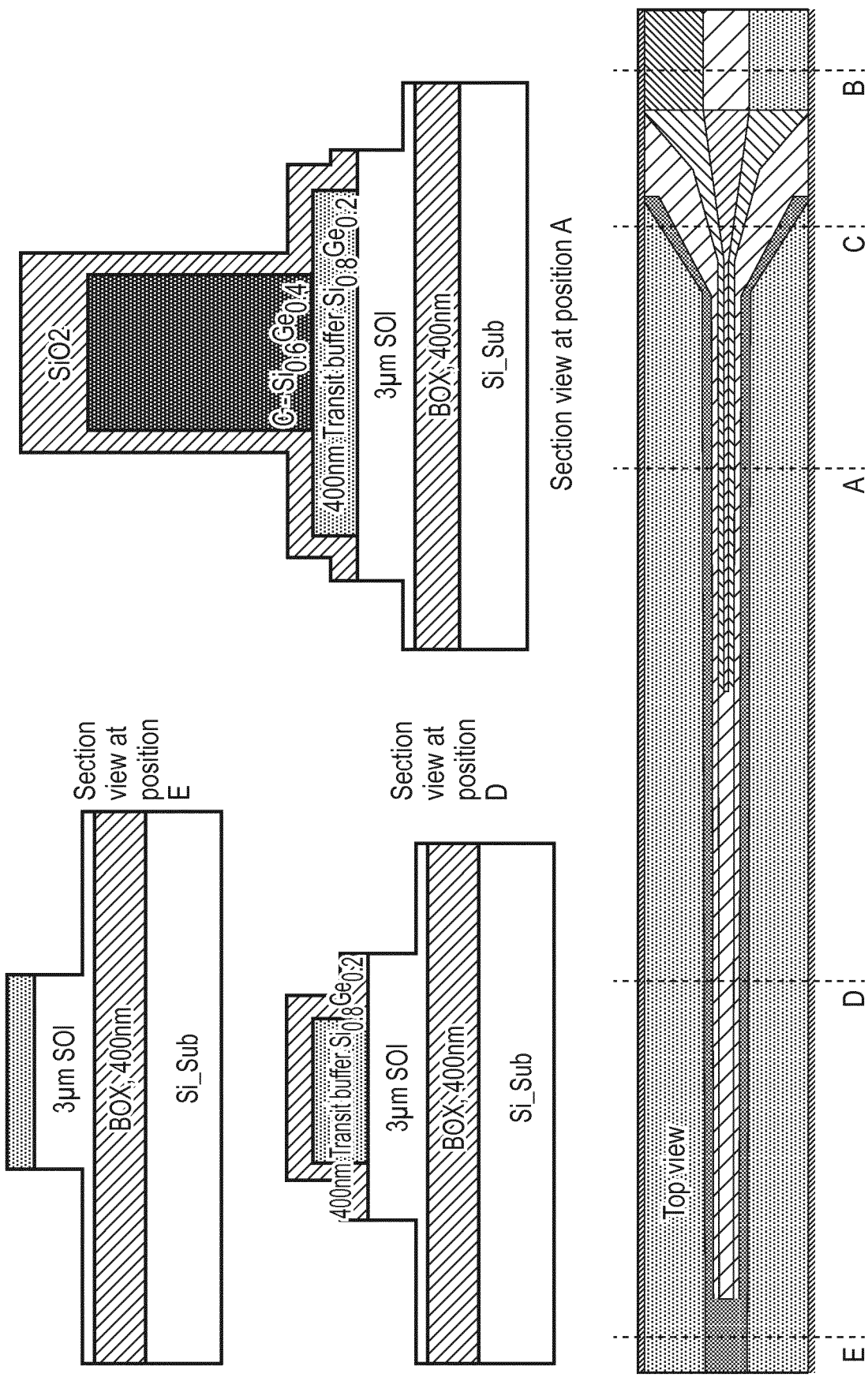
Figure 19P:
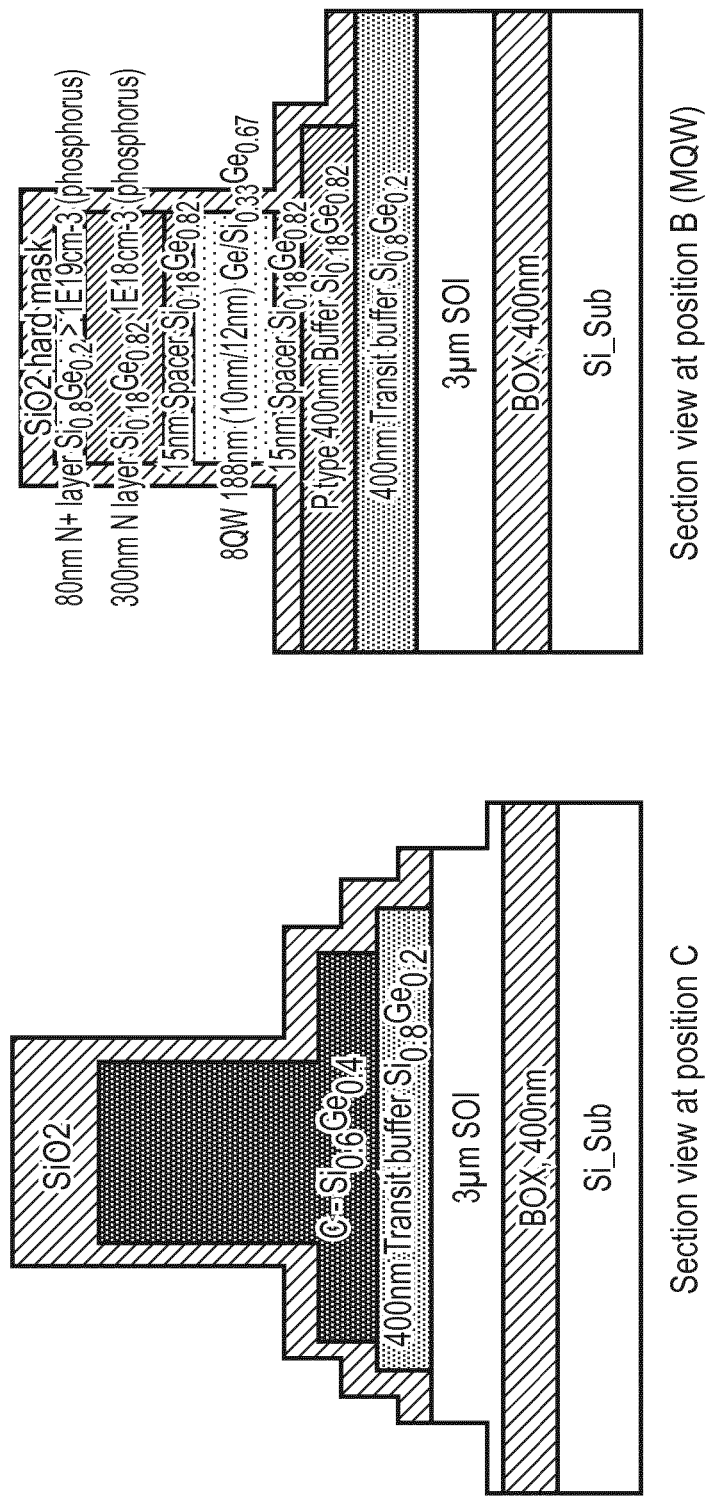

FIG. 19P shows the results after SOI waveguide dry etching process. The dry etching process etches away 2.8 μm silicon with 200 nm slab layer left. The lower part of FIG. 19P shows the top view after SOI waveguide etching, and the upper part of FIG. 19P shows the sections views at positions A, B, C, D and E.

Figure 19Q:
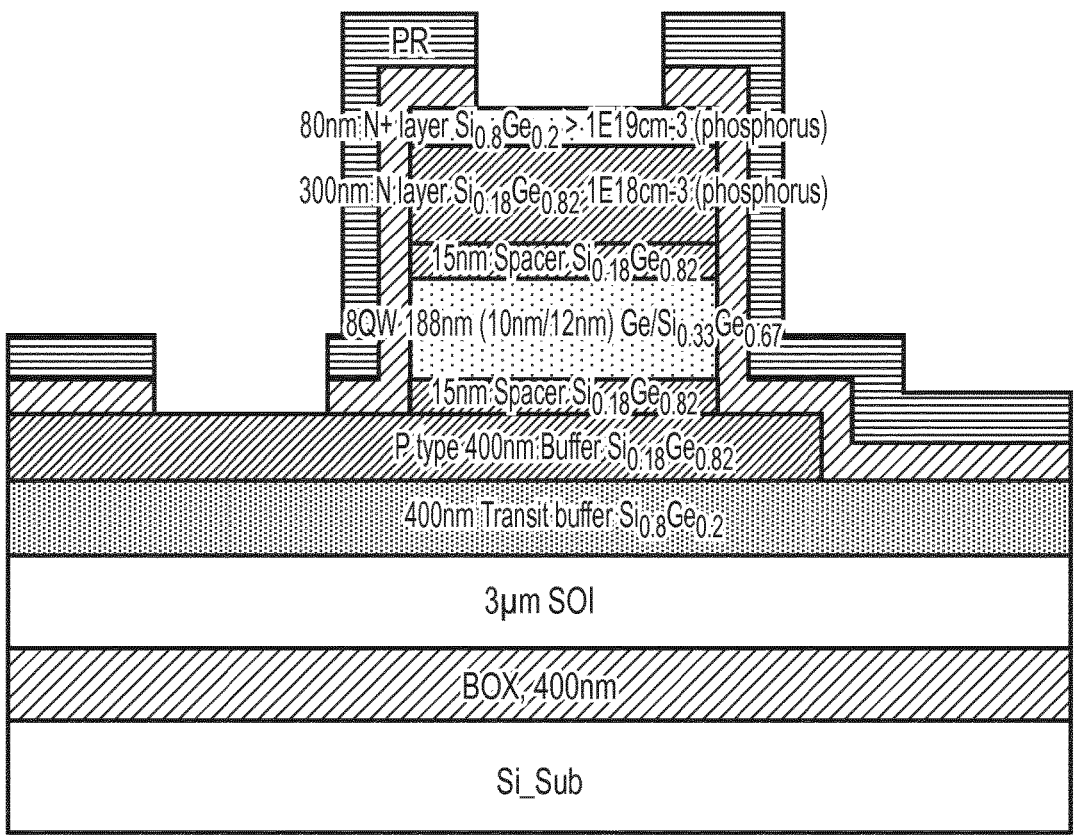
Figure 19Q:
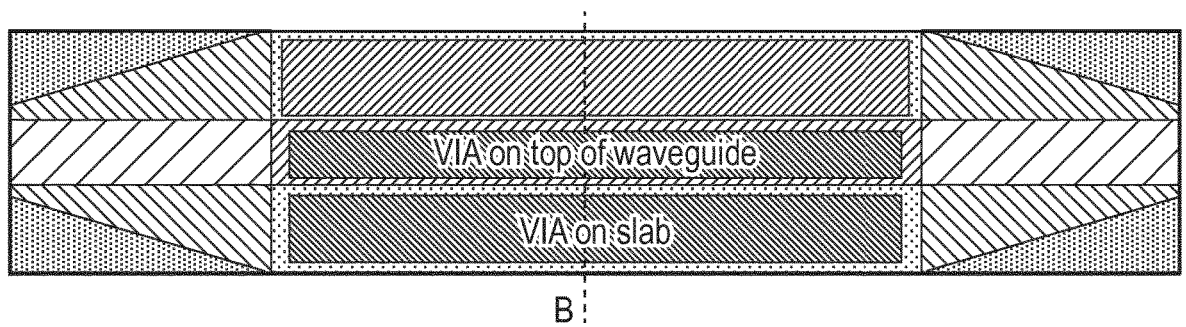

After SOI waveguide etching, a layer of SiO$_2$ cladding is deposited followed by a via opening process, which opens the electrode contact areas on top of MQW waveguide N-type region and on the MQW slab P-type region. The top view of via opening process is shown in the lower part of FIG. 19Q, and the section view at position B is shown in the upper part of FIG. 19Q.

Figure 19R:
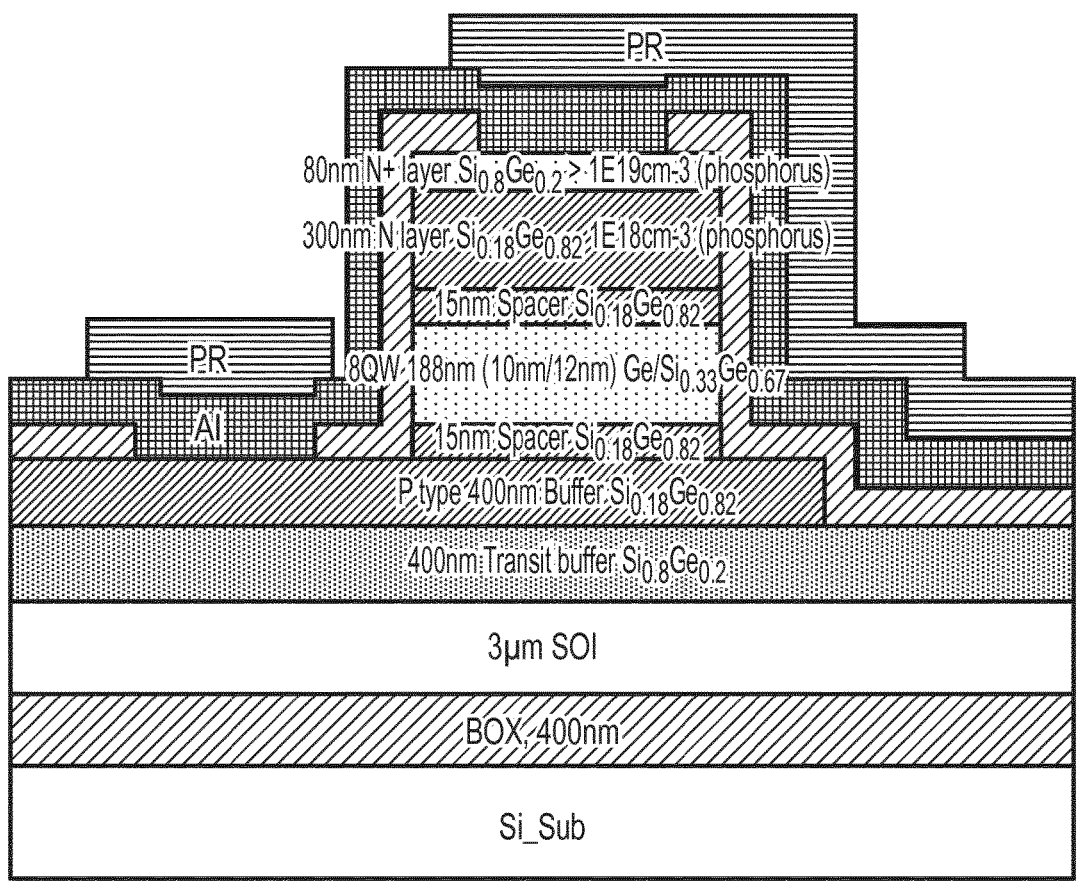
Figure 19R:
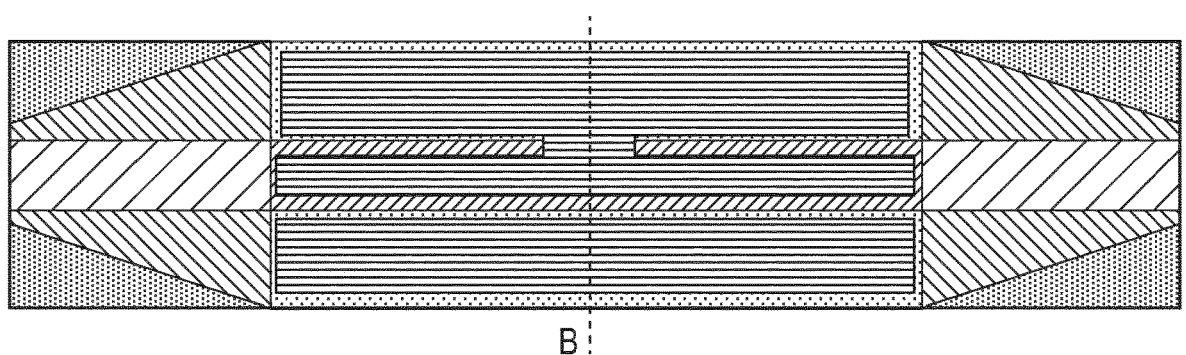
Figure 19S:
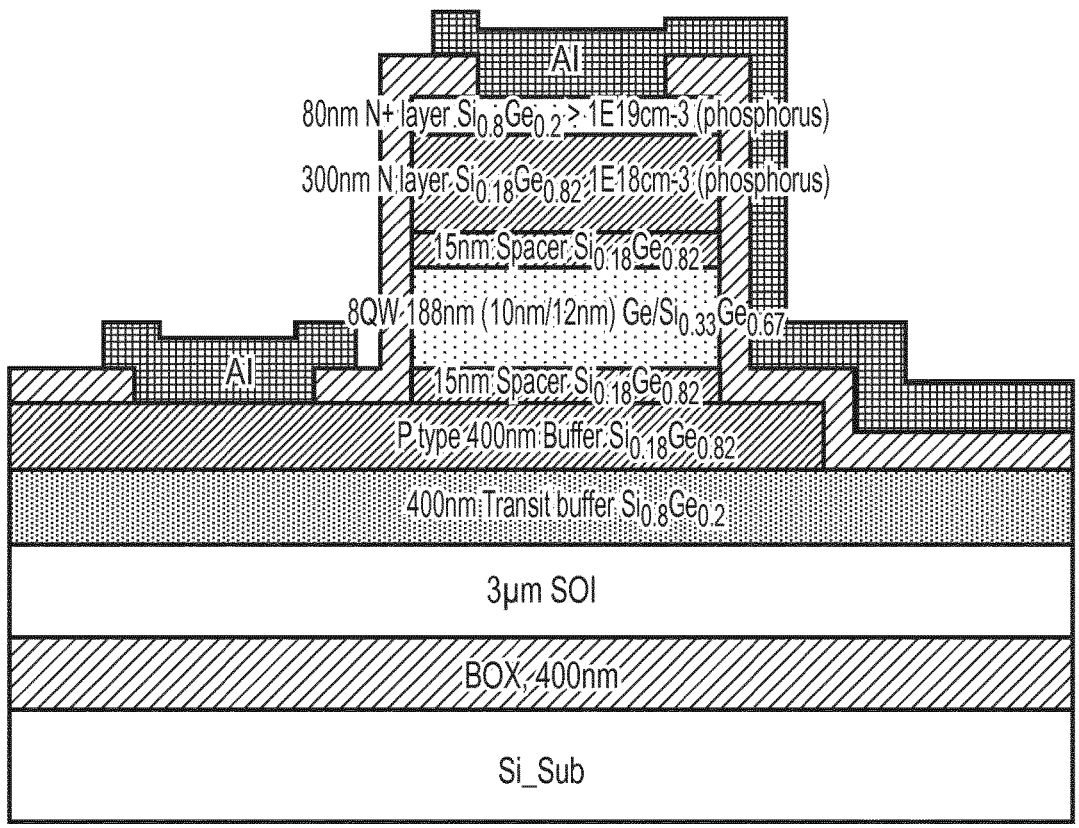
Figure 19S:
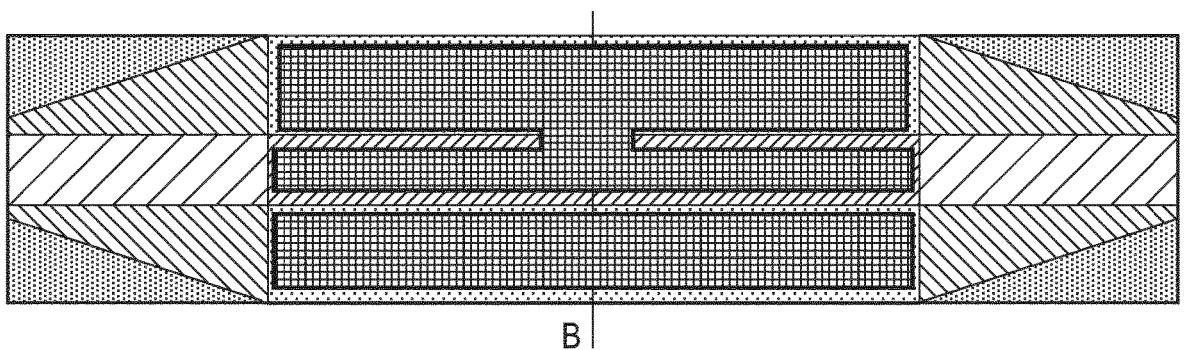

In FIG. 19R, the contact metal layers are deposited followed by the electrode patterning process. The metal layers comprise 30 nm Titanium and 1000 nm aluminium. The lower part of FIG. 19R shows the top view, and the upper part of FIG. 19R shows the section view at position B.

Figure 20:
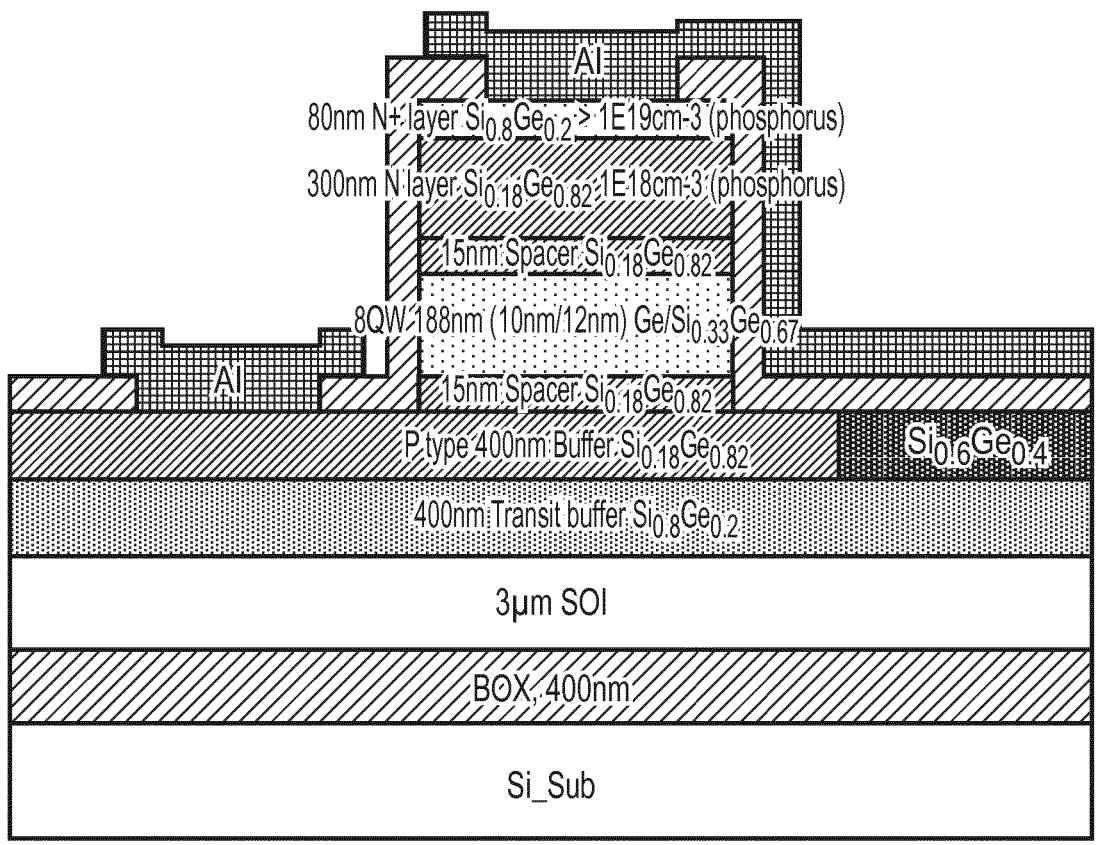
FIG. 20 shows an alternative device structure of the device shown in FIG. 17.

FIG. 19S shows the results after metal etching and photoresist stripping, which completes the device fabrication process. The lower part of FIG. 19S shows the top view, and the upper part of FIG. 19S shows the section view at position B FIG. 20 shows an alternative device structure with epitaxial grown $Si_{0.6}Ge_{0.4}$ filled underneath the top electrode pad. This alternative device structure can be realized by positioning the MQW waveguide close to the MQW mesa edge in the process steps shown in FIG. 19I and FIG. 19J. with all other following device fabrication processes being the same as described above.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

All references referred to above are hereby incorporated by reference.

The invention claimed is:

1. A silicon based electro-optically active device, comprising:
   a silicon-on-insulator (SOI) waveguide;
   an electro-optically active waveguide, including an electro-optically active stack, disposed on top of the SOI waveguide;
   a first epitaxially grown structure;
   a second epitaxially grown structure; and
   an evanescent coupling structure comprising a first evanescent coupling structure and a second evanescent coupling structure,
   the first epitaxially grown structure having a first passive waveguide,
   the second epitaxially grown structure having a second passive waveguide,
   the first and second passive waveguides being disposed adjacent to respective sides of the electro-optically active stack,
   wherein:
      the first and second passive waveguides are configured to edge couple light from the first passive waveguide into the electro-optically active stack and from the electro-optically active stack into the second passive waveguide;
      the first and second evanescent coupling structures are configured to evanescently couple light between the SOI waveguide and the first and second passive waveguides, respectively;
      the first evanescent coupling structure is adjacent to a first interface between the first passive waveguide and the electro-optically active stack; and
      the second evanescent coupling structure is adjacent to a second interface between the second passive waveguide and the electro-optically active stack.

2. The electro-optically active device of claim 1, wherein the electro-optically active stack includes a multiple quantum well region.

3. The electro-optically active device of claim 1, further comprising a first insulator layer and a second insulator layer respectively disposed between the electro-optically active stack and the first passive waveguide and between the electro-optically active stack and the second passive waveguide.

4. The electro-optically active device of claim 1, wherein the electro-optically active device is a quantum confined Stark effect modulator.

5. A method of producing the silicon based electro-optically active device of claim 1, the method including the following steps:
   epitaxially growing the electro-optically active stack on top of the SOI waveguide, and etching the electro-optically active stack to form the electro-optically active waveguide;
   etching opposite sides of the electro-optically active stack to produce planar sides of the electro-optically active stack;
   forming the first passive waveguide and the second passive waveguide, each being adjacent to respective planar sides of the electro-optically active stack; and
   forming the evanescent coupling structure between the first passive waveguide and the SOI waveguide and between the SOI waveguide and the second passive waveguide, for evanescently coupling the SOI waveguide to the first passive waveguide and the second passive waveguide.

6. The method of claim 5, wherein the step of growing the electro-optically active stack on top of the SOI waveguide includes a step of forming a multiple quantum well region.

7. The method of claim 5, wherein the step of forming the first passive waveguide and the second passive waveguide comprises epitaxially growing the first epitaxially grown structure and the second epitaxially grown structure and etching the first epitaxially grown structure and the second epitaxially grown structure to form the first passive waveguide and the second passive waveguide.

8. The method of claim 7, including a step of disposing a first and second insulator layer adjacent to respective sides of the electro-optically active stack before epitaxially growing the first epitaxially grown structure and the second epitaxially grown structure.

9. The method of claim 7, including a step of disposing an insulating cap layer on top of the electro-optically active stack before epitaxially growing the first and second epitaxially grown structures.

10. The method of claim 5, wherein the evanescent coupling structure comprises a material containing less than 40 at. % germanium.

11. The method of claim 5, wherein the step of forming the evanescent coupling structure includes etching the first and second passive waveguides so as to produce the first evanescent coupling structure and the second evanescent coupling structure.

12. The method of claim 5, wherein the electro-optically active device is a quantum confined Stark effect modulator.

13. A silicon based electro-optically active device, comprising:
   a silicon-on-insulator (SOI) waveguide;
   an electro-optically active waveguide, including an electro-optically active stack, disposed on top of the SOI waveguide;
   a first epitaxially grown structure;
   a second epitaxially grown structure; and
   an evanescent coupling structure comprising a first taper region, an evanescent coupling region, and a second taper region,
   the first epitaxially grown structure having a first passive waveguide,
   the second epitaxially grown structure having a second passive waveguide,
   the first and second passive waveguides being disposed adjacent to respective sides of the electro-optically active stack,
   wherein:
      the first and second passive waveguides are configured to edge couple light from the first passive waveguide into the electro-optically active stack and from the electro-optically active stack into the second passive waveguide; and
      the evanescent coupling structure is configured to evanescently couple light between the SOI waveguide and the first and second passive waveguides.

14. The electro-optically active device of claim 13, wherein the evanescent coupling region comprises a material containing less than 40 at. % germanium.

15. A silicon based electro-optically active device, comprising:
- a silicon-on-insulator (SOI) waveguide;
- an electro-optically active waveguide, including an electro-optically active stack, disposed on top of the SOI waveguide;
- a first epitaxially grown structure;
- a second epitaxially grown structure; and
- an evanescent coupling structure,
- the first epitaxially grown structure having a first passive waveguide,
- the second epitaxially grown structure having a second passive waveguide,
- the first and second passive waveguides being disposed adjacent to respective sides of the electro-optically active stack, wherein:
- each of the first and second passive waveguide is formed of a stack of a first silicon layer, a silicon germanium layer, and a second silicon layer;
- the first and second passive waveguides are configured to edge couple light from the first passive waveguide into the electro-optically active stack and from the electro-optically active stack into the second passive waveguide; and
- the evanescent coupling structure is configured to evanescently couple light between the SOI waveguide and the first and second passive waveguides.

16. A silicon based electro-optically active device, comprising:
- a silicon-on-insulator (SOI) waveguide;
- an electro-optically active waveguide, including an electro-optically active stack, disposed on top of the SOI waveguide;
- a first epitaxially grown structure;
- a second epitaxially grown structure; and
- an evanescent coupling structure,
- the first epitaxially grown structure having a first passive waveguide,
- the second epitaxially grown structure having a second passive waveguide,
- the first and second passive waveguides being disposed adjacent to respective sides of the electro-optically active stack, wherein:
- the first and second passive waveguides are configured to edge couple light from the first passive waveguide into the electro-optically active stack and from the electro-optically active stack into the second passive waveguide;
- the evanescent coupling structure is configured to evanescently couple light between the SOI waveguide and the first and second passive waveguides; and
- the electro-optically active stack includes one or more angled facets which are angled relative to a waveguiding direction of the SOI waveguide.

* * * * *